US010315362B2

(12) United States Patent
Kozawa

(10) Patent No.: US 10,315,362 B2
(45) Date of Patent: Jun. 11, 2019

(54) VEHICLE LAMP AND LENS MOLDED ARTICLE

(71) Applicant: ASAHI KASEI KABUSHIKI KAISHA, Tokyo (JP)

(72) Inventor: Kazunori Kozawa, Tokyo (JP)

(73) Assignee: ASAHI KASEI KABUSHIKI KAISHA, Tokyo (JP)

(*) Notice: Subject to any disclaimer, the term of this patent is extended or adjusted under 35 U.S.C. 154(b) by 182 days.

(21) Appl. No.: 15/531,373

(22) PCT Filed: Oct. 29, 2015

(86) PCT No.: PCT/JP2015/080558
§ 371 (c)(1),
(2) Date: May 26, 2017

(87) PCT Pub. No.: WO2016/084545
PCT Pub. Date: Jun. 2, 2016

(65) Prior Publication Data

US 2017/0326811 A1 Nov. 16, 2017

(30) Foreign Application Priority Data

Nov. 27, 2014 (JP) ................................ 2014-240539

(51) Int. Cl.

| | |
|---|---|
| ***B29C 65/16*** | (2006.01) |
| ***F21S 43/27*** | (2018.01) |
| ***F21S 43/00*** | (2018.01) |
| ***F21V 5/04*** | (2006.01) |
| ***C08L 33/10*** | (2006.01) |
| ***C08L 33/12*** | (2006.01) |
| ***F21V 17/10*** | (2006.01) |
| ***B29C 65/82*** | (2006.01) |
| ***B29C 65/00*** | (2006.01) |
| *B29K 33/00* | (2006.01) |
| *B29L 31/30* | (2006.01) |
| *B29L 31/00* | (2006.01) |
| *B29C 65/14* | (2006.01) |

(52) U.S. Cl.
CPC .......... *B29C 65/16* (2013.01); *B29C 65/8215* (2013.01); *B29C 66/112* (2013.01); *B29C 66/114* (2013.01); *B29C 66/24244* (2013.01); *B29C 66/53461* (2013.01); *B29C 66/542* (2013.01); *B29C 66/71* (2013.01); *C08L 33/10* (2013.01); *C08L 33/12* (2013.01); *F21S 43/00* (2018.01); *F21S 43/27* (2018.01); *F21V 5/04* (2013.01); *F21V 17/101* (2013.01); *B29C 65/1477* (2013.01); *B29C 65/1609* (2013.01); *B29C 65/1616* (2013.01); *B29C 66/7311* (2013.01); *B29K 2033/12* (2013.01); *B29L 2031/30* (2013.01); *B29L 2031/747* (2013.01); *C08L 2205/025* (2013.01)

(58) Field of Classification Search
None
See application file for complete search history.

(56) References Cited

U.S. PATENT DOCUMENTS 6,450,675 B1 * 9/2002 Nishimoto .............. B29C 65/20 362/546
9,328,186 B2 * 5/2016 Tomita .................. C08F 265/04

FOREIGN PATENT DOCUMENTS

| | | | |
|---|---|---|---|
| JP | 2004-223909 | A | 8/2004 |
| JP | 2005-29657 | A | 2/2005 |
| JP | 2005-339988 | A | 12/2005 |
| JP | 4333950 | B2 | 9/2009 |
| JP | 2011-168683 | A | 9/2011 |
| JP | 2012-171982 | A | 9/2012 |
| JP | 2013-249485 | A | 12/2013 |
| WO | WO 2009/022714 | A | 2/2009 |

OTHER PUBLICATIONS

International Search Report for PCT/JP2015/080558 (PCT/ISA/210) dated Feb. 2, 2016.
Written Opinion of the International Searching Authority for PCT/JP2015/080558 (PCT/ISA/237) dated Feb. 2, 2016.
International Preliminary Report on Patenability and Written Opinion dated May 30, 2017, in PCT International Application No. PCT/JP2015/080558, with English translation.

* cited by examiner

*Primary Examiner* — Sheeba Ahmed
(74) *Attorney, Agent, or Firm* — Birch, Stewart, Kolasch & Birch, LLP

(57) ABSTRACT

The present invention provides a vehicle lamp comprising a lens molded article (1) and a housing molded article (2) laser-welded to each other, the lens molded article (1) comprising a methacrylic resin composition which comprises 70 to 99.9% by mass of a methacrylic acid ester monomer unit and 0.1 to 30% by mass of a unit of an additional vinyl monomer copolymerizable with the methacrylic acid ester monomer and satisfies conditions (a) to (c), and the housing molded article (2) comprising a resin which satisfies a condition (d): (a) MW is 90000 to 250000; (b) a mass (MFR-1) of the methacrylic resin composition emitted according to ISO1133 standard at 230° C. and 3.8 kg for 10 minutes is 0.2 to 12 g/10 min; (c) when a mass of the methacrylic resin composition emitted according to the ISO1133 standard at 230° C. and 10 kg for 10 minutes is defined as MFR-2, MFR ratio=(MFR-2)/(MFR-1) is 4.5 or more; and (d) a mass (MFR-3) of the resin emitted according to the ISO1133 standard at 220° C. and 10 kg for 10 minutes is 2 to 45 g/10 min or smaller.

8 Claims, 6 Drawing Sheets

[Figure 1]
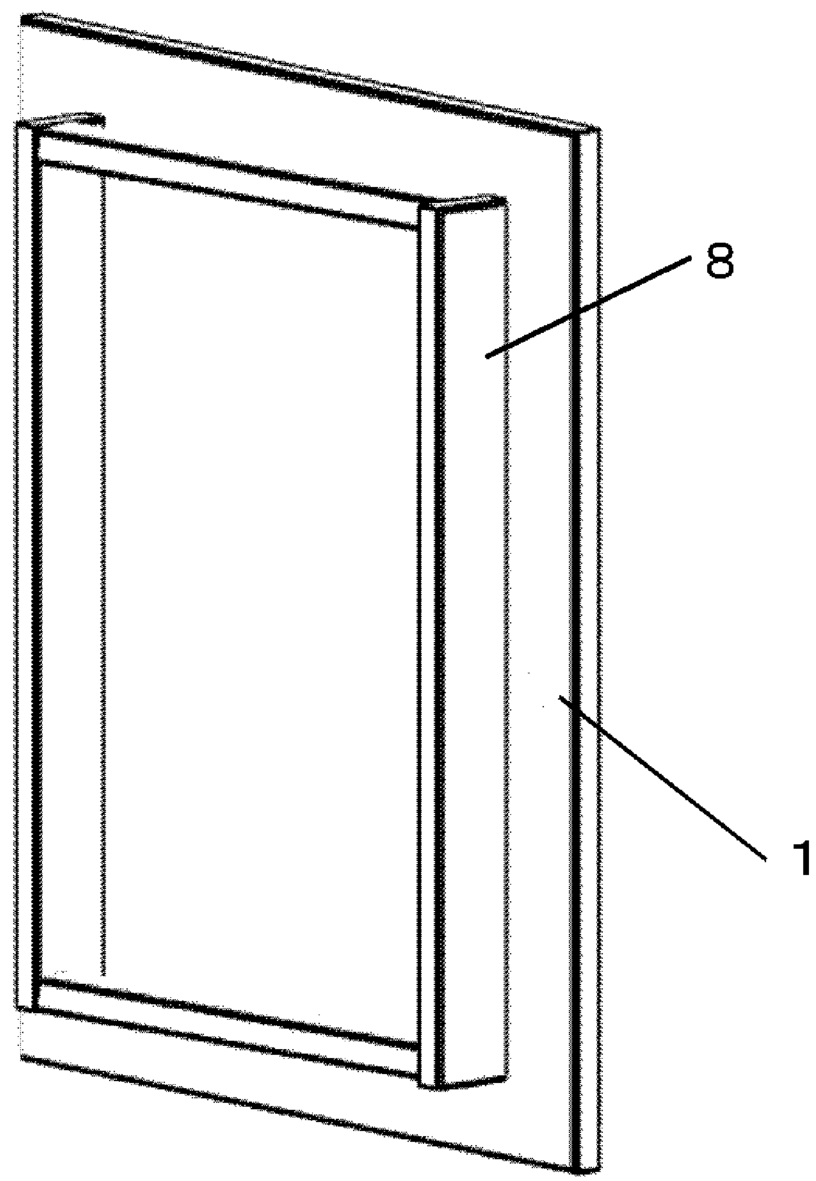

[Figure 2]
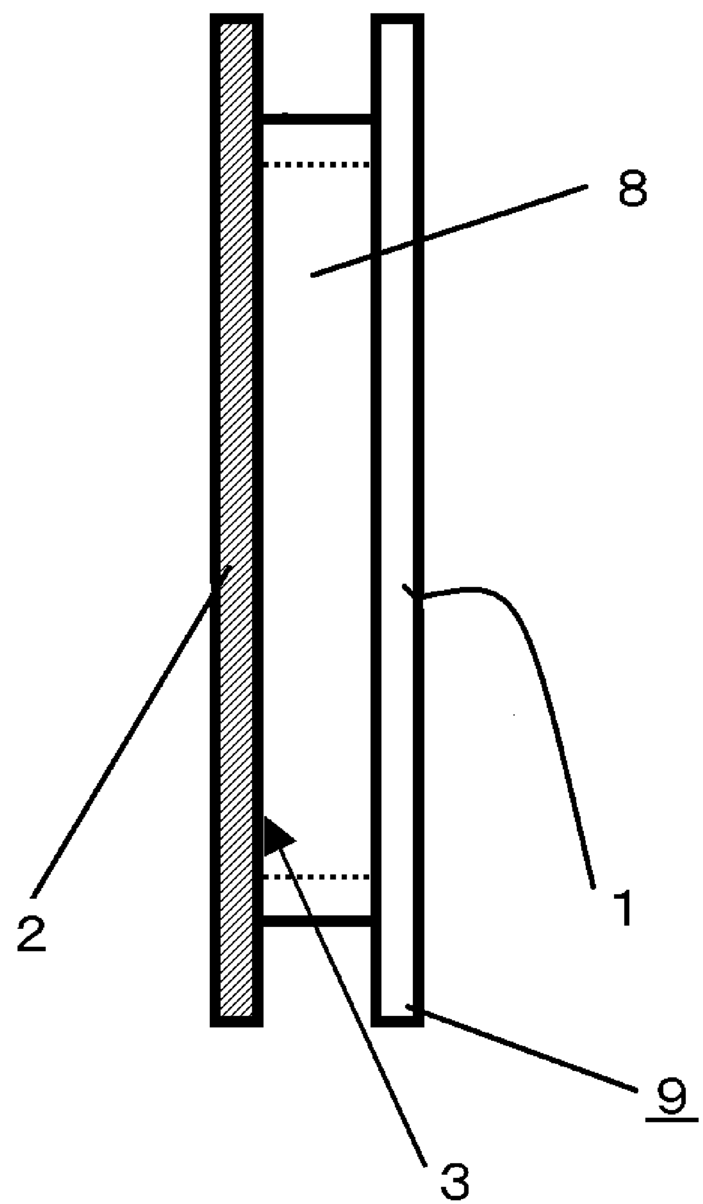

[Figure 3]
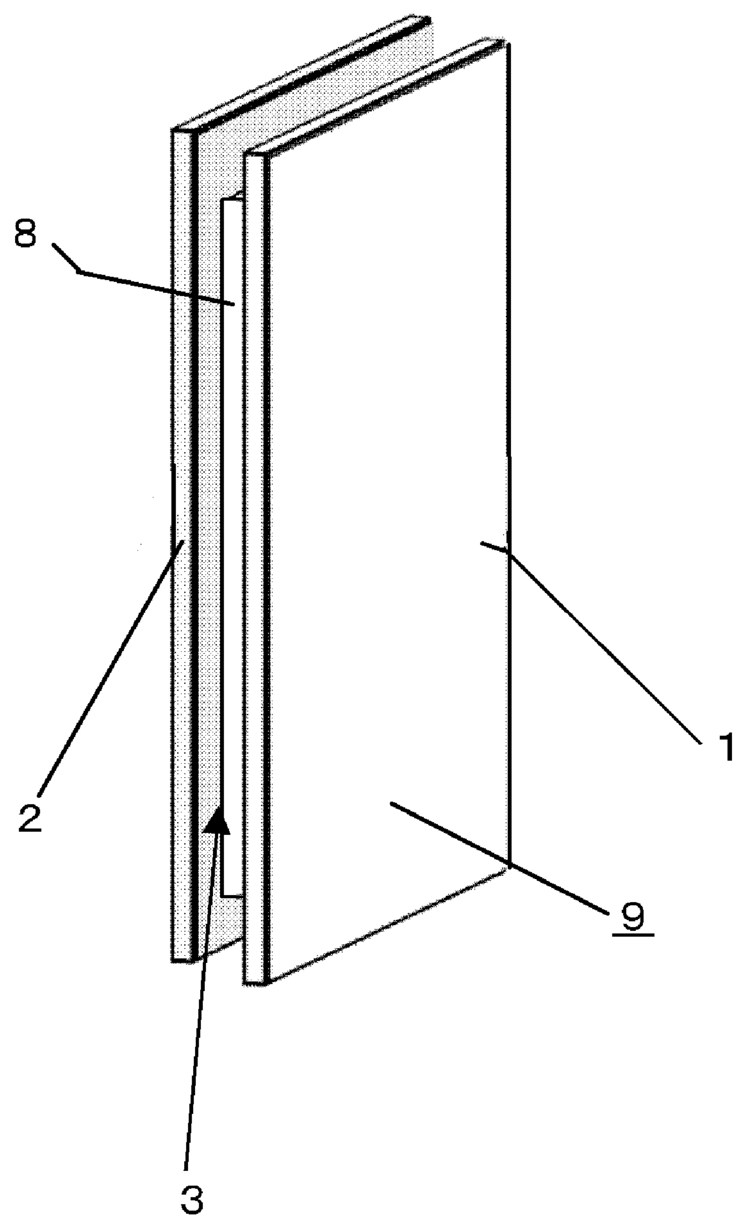

[Figure 4]
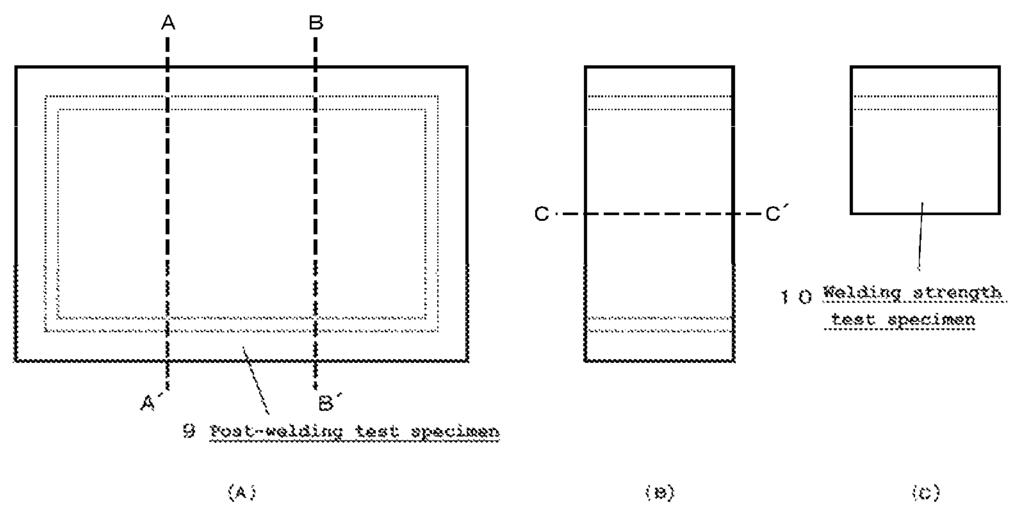

[Figure 5]
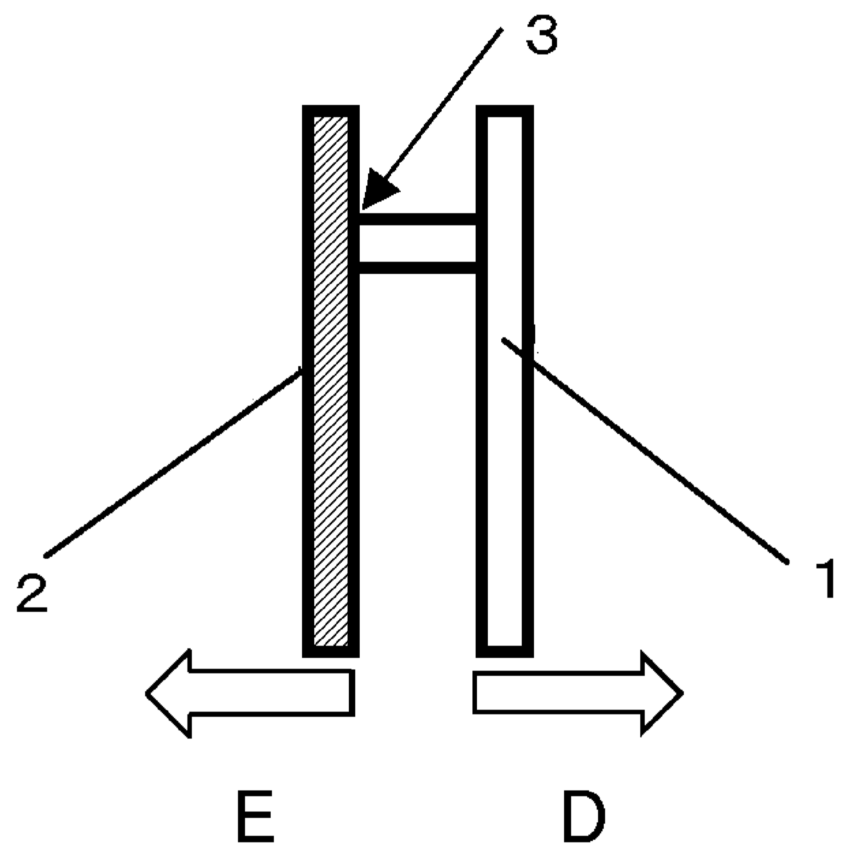

[Figure 6]
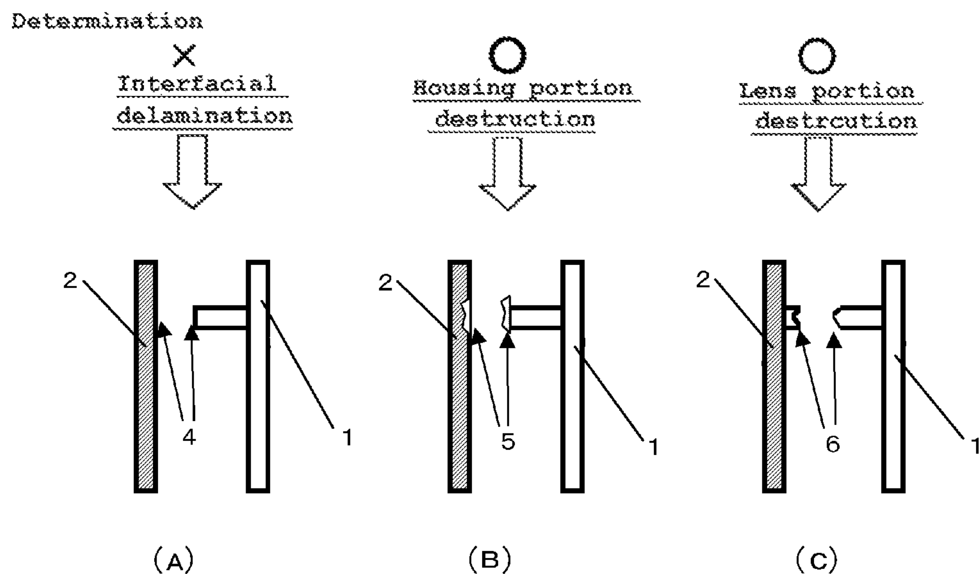
[Figure 7]
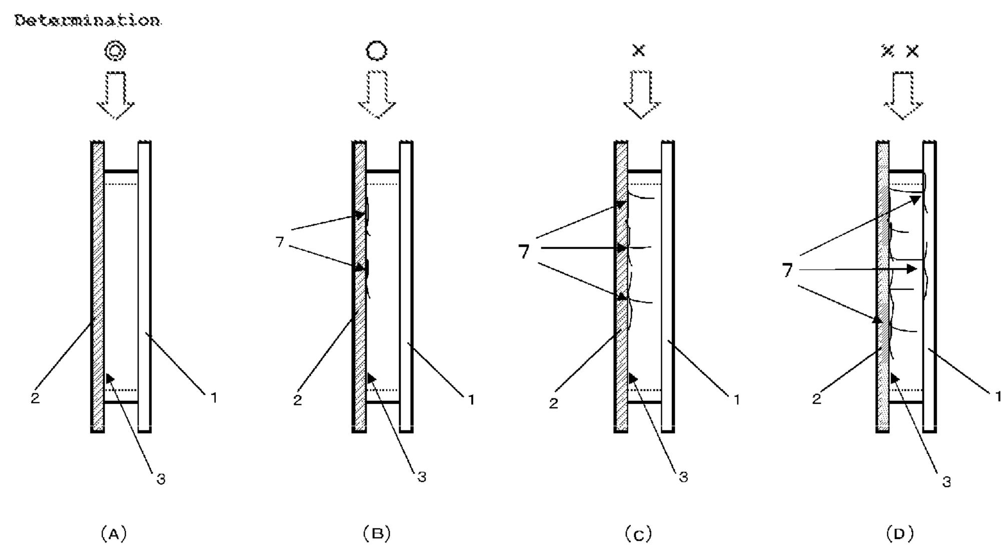

VEHICLE LAMP AND LENS MOLDED ARTICLE

TECHNICAL FIELD

The present invention relates to a vehicle lamp and a lens molded article.

BACKGROUND ART

Methacrylic resins typified by polymethyl methacrylate (PMMA) are characterized, as transparent resins, by having higher optical transmittance, weather resistance, and rigidity than those of other plastic transparent resins and have heretofore been widely used for purposes such as components for vehicles, lighting equipment, materials for building construction, signboards, nameplates, paintings, and windows for display apparatuses.

The methacrylic resins are often used, particularly, as materials for lens members in vehicle lamps.

The vehicle lamps are usually constituted by a lens portion welded to a housing portion. Hot plate welding has typically been practiced as a conventional method for welding a lens molded article for use in the lens portion and a housing molded article.

The hot plate welding, however, presents problems such as poor appearance or poor looks of welded surface caused by resin threads after heating. Therefore, laser welding, which is free from such problems, has been increasingly adopted in recent years.

On the other hand, for use in vehicles, thinning has proceeded recently for the purpose of reducing weights in association with improvement in fuel economy, while upsizing has proceeded for realizing fresh designs. There arises a new problem that warpage occurs in molded articles due to charging pressure increased during the charging of resin materials into molded article materials, resulting in reduction in welding strength or solvent resistance. Furthermore, there also arises a deformation problem ascribable to heat.

Patent Literature 1 discloses a resin improved in terms of flowability in injection molded article and solvent resistance.

Patent Literature 2 discloses a technique using a methacrylic resin in lens members for marker lights for vehicles.

Patent Literature 3 discloses a method which involves applying pressure to a warped molded article and laser-welding a lens molded article and a housing molded article kept in close contact.

CITATION LIST

Patent Literature

Patent Literature 1: Japanese Patent Laid-Open No. 2013-249485

Patent Literature 2: Japanese Patent Laid-Open No. 2005-29657

Patent Literature 3: Japanese Patent Laid-Open No. 2005-339988

SUMMARY OF INVENTION

Technical Problem

However, Patent Literature 1 has not sufficiently discussed welding strength in laser welding. Unfortunately, use of the resin described in Patent Literature 1 cannot satisfy strength and solvent resistance at the same time as a vehicle lamp.

Patent Literature 2 makes no mention about an approach for solving welding strength or solvent resistance.

The method described in Patent Literature 3 might cause reduction in welding strength or reduction in solvent resistance due to residual stress during laser welding. Patent Literature 3 makes no mention about measures against such a defect.

The present invention has been made in light of the problems of the conventional techniques mentioned above, and an object of the present invention is to provide a vehicle lamp excellent in welding strength, solvent resistance, and heat resistance.

Solution to Problem

The present inventors have conducted diligent studies to solve the problems described above and consequently completed the present invention by finding that the problems associated with welding strength, solvent resistance, and heat resistance can be solved by combining a lens molded article containing a methacrylic resin composition that satisfies predetermined conditions with a housing molded article that satisfies a predetermined condition.

Specifically, the present invention is as described below.

[1]

A vehicle lamp comprising a lens molded article and a housing molded article laser-welded to each other, the lens molded article comprising a methacrylic resin composition which comprises 70 to 99.9% by mass of a methacrylic acid ester monomer unit and 0.1 to 30% by mass of a unit of at least one additional vinyl monomer copolymerizable with the methacrylic acid ester monomer and satisfies following conditions (a) to (c), and the housing molded article comprising a resin which satisfies following condition (d):

(a) a weight-average molecular weight measured by gel permeation chromatography (GPC) is 90000 to 250000;

(b) a value of a mass (MFR-1) of the methacrylic resin composition emitted according to ISO1133 standard under conditions involving a temperature of 230° C. and a load of 3.8 kg for 10 minutes is in a range of 0.2 g/10 min or larger and smaller than 12 g/10 min;

(c) when a mass of the methacrylic resin composition emitted according to the ISO1133 standard under conditions involving a temperature of 230° C. and a load of 10 kg for 10 minutes is defined as MFR-2, an MFR ratio of following formula (1) is 4.5 or more:

$$\text{MFR ratio} = (\text{MFR-2})/(\text{MFR-1}) \quad (1); \text{ and}$$

(d) a mass (MFR-3) of the resin emitted according to the ISO1133 standard under conditions involving a temperature of 220° C. and a load of 10 kg for 10 minutes is 2 g/10 min or larger and 45 g/10 min or smaller.

[2]

The vehicle lamp according to the above [1], wherein the housing molded article comprises at least one resin selected from the group consisting of an ASA resin, an ABS resin, an AES resin, a SAS resin, and an ACS resin.

[3]

The vehicle lamp according to the above [1] or [2], wherein a difference in a Vicat softening temperature between the lens molded article and the housing molded article is 30° C. or less.

[4]

The vehicle lamp according to any one of the above [1] to [3], wherein a Vicat softening temperature of the lens molded article is 98° C. or higher.

[5]

The vehicle lamp according to any one of the above [1] to [4], wherein a Vicat softening temperature of the housing molded article is 96° C. or higher.

[6]

The vehicle lamp according to any one of the above [1] to [5], wherein a value of the MFR-1 is in a range of 0.2 g/10 min or larger and smaller than 10 g/10 min.

[7]

The vehicle lamp according to any one of the above [1] to [6], wherein the MFR ratio is 4.8 or more.

[8]

A lens molded article for laser welding comprising a methacrylic resin composition which comprises 70 to 99.9% by mass of a methacrylic acid ester monomer unit and 0.1 to 30% by mass of a unit of at least one additional vinyl monomer copolymerizable with the methacrylic acid ester monomer and satisfies following conditions (a) to (c):

(a) a weight-average molecular weight measured by gel permeation chromatography (GPC) is 90000 to 250000;

(b) a value of a mass (MFR-1) of the methacrylic resin composition emitted according to ISO1133 standard under conditions involving a temperature of 230° C. and a load of 3.8 kg for 10 minutes is in a range of 0.2 g/10 min or larger and smaller than 12 g/10 min; and (c) when a mass of the methacrylic resin composition emitted according to the ISO1133 standard under conditions involving a temperature of 230° C. and a load of 10 kg for 10 minutes is defined as MFR-2, an MFR ratio of following formula (1) is 4.5 or more:

$$\text{MFR ratio}=(\text{MFR-2})/(\text{MFR-1}) \quad (1).$$

Advantageous Effects of Invention

According to the present invention, a vehicle lamp that has practically sufficient welding strength and is also excellent in solvent resistance and heat resistance is obtained.

BRIEF DESCRIPTION OF DRAWINGS

FIG. 1 shows a schematic perspective view of a ribbed plate.

FIG. 2 shows a schematic side view of a post-welding test specimen after laser welding of the ribbed plate and a plate.

FIG. 3 shows a schematic perspective view of the post-welding test specimen after laser welding of the ribbed plate and the plate.

FIGS. 4(A) to 4(C) each show a schematic plane view for illustrating a method for cutting a welding strength test specimen.

FIG. 5 shows a schematic side view for illustrating a method for conducting a destruction test.

FIGS. 6(A) to 6(C) each show a schematic side view for illustrating criteria for determination after the destruction test.

FIGS. 7(A) to 7(C) each show a schematic side view for illustrating criteria for determination in a solvent crack test.

DESCRIPTION OF EMBODIMENTS

Hereinafter, the mode for carrying out the present invention (hereinafter, referred to as the "present embodiment") will be described in detail.

The present embodiment described below is merely given for illustrating the present invention and is not intended to limit the present invention to the contents described below. The present invention can be carried out by making appropriate change or modification without departing from the spirit of the present invention.

In the present specification, each monomer component before polymerization is referred to as an "XX monomer", and the term "monomer" may be omitted.

Also, each constitutional unit constituting a polymer is referred to as an "XX monomer unit" and may be simply referred to as an "XX unit".

In the present specification, "(meth)acryl" means "acryl" and "methacryl" corresponding thereto, and "(meth)acrylate" means "acrylate" and "methacrylate" corresponding thereto.

[Vehicle Lamp]

The vehicle lamp of the present embodiment is a vehicle lamp comprising a lens molded article and a housing molded article joined to each other by laser welding, the lens molded article containing a methacrylic resin composition which comprises 70 to 99.9% by mass of a methacrylic acid ester monomer unit and 0.1 to 30% by mass of a unit of at least one additional vinyl monomer copolymerizable with the methacrylic acid ester monomer and satisfies the following conditions (a) to (c), and the housing molded article containing a resin which satisfies the following condition (d):

(a) the weight-average molecular weight measured by gel permeation chromatography (GPC) is 90000 to 250000;

(b) the value of the mass (MFR-1) of the methacrylic resin composition emitted according to the ISO1133 standard under conditions involving a temperature of 230° C. and a load of 3.8 kg for 10 minutes is in the range of 0.2 g/10 min or larger and smaller than 12 g/10 min;

(c) when the mass of the methacrylic resin composition emitted according to the ISO1133 standard under conditions involving a temperature of 230° C. and a load of 10 kg for 10 minutes is defined as MFR-2, an MFR ratio of the following formula (1) is 4.5 or more:

$$\text{MFR ratio}=(\text{MFR-2})/(\text{MFR-1}) \quad (1); \text{ and}$$

(d) the mass (MFR-3) of the resin emitted according to the ISO1133 standard under conditions involving a temperature of 220° C. and a load of 10 kg for 10 minutes is 2 g/10 min or larger and 45 g/10 min or smaller.

The vehicle lamp of the present embodiment is constituted by, as described above, a lens molded article and a housing molded article joined to each other by laser welding.

[Lens Molded Article]

The lens molded article constituting the vehicle lamp of the present embodiment is, as described above, a lens molded article for laser welding containing a methacrylic resin composition which comprises 70 to 99.9% by mass of a methacrylic acid ester monomer unit and 0.1 to 30% by mass of a unit of at least one additional vinyl monomer copolymerizable with the methacrylic acid ester monomer and satisfies the conditions (a) to (c).

Hereinafter, the methacrylic resin composition will be described.

(Methacrylic Resin Composition)

The methacrylic resin composition contained in the lens molded article of the vehicle lamp of the present embodiment comprises, as described above, 70 to 99.9% by mass of a methacrylic acid ester monomer unit and 0.1 to 30% by mass of a unit of at least one additional vinyl monomer copolymerizable with the methacrylic acid ester.

<Methacrylic Acid Ester Monomer Unit>

The monomer constituting the methacrylic acid ester monomer unit contained in the methacrylic resin composition is not particularly limited as long as the effects of the present invention can be achieved. Preferred examples thereof include a monomer represented by the following general formula (1):

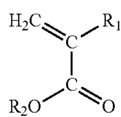
(1)

In the general formula (1), $R_1$ represents a methyl group. $R_2$ represents a hydrocarbon group having 1 to 18 carbon atoms in which a hydrogen atom on carbon may be replaced with a hydroxy group or a halogen group.

Examples of the monomer constituting the methacrylic acid ester monomer unit include, but are not limited to, butyl methacrylate, ethyl methacrylate, methyl methacrylate, propyl methacrylate, isopropyl methacrylate, cyclohexyl methacrylate, phenyl methacrylate, (2-ethylhexyl) methacrylate, (t-butylcyclohexyl) methacrylate, benzyl methacrylate, and (2,2,2-trifluoroethyl) methacrylate. The monomer is typically methyl methacrylate.

Only one of these methacrylic acid ester monomers may be used alone, or two or more thereof may be used in combination.

The methacrylic acid ester monomer used may be the same as or different from that in a polymer (1) and a polymer (2) (which will be mentioned later) constituting the methacrylic resin composition.

The content of the methacrylic acid ester monomer unit in the methacrylic resin composition contained in the lens molded article constituting the vehicle lamp of the present embodiment is 70 to 99.9 (% by mass) in the methacrylic resin composition.

When the content of the methacrylic acid ester monomer unit is 70% by mass or larger, favorable heat resistance is obtained in the methacrylic resin composition. When the content of the methacrylic acid ester monomer unit is 99.9% by mass or smaller, favorable flowability is obtained. The content is preferably 75 to 99.9% by mass, more preferably 80 to 99.9% by mass, further preferably 85 to 99.9% by mass, still further preferably 90 to 99.9% by mass.

<Unit of Additional Vinyl Monomer Copolymerizable with Methacrylic Acid Ester Monomer>

Examples of the monomer constituting the unit of the additional vinyl monomer copolymerizable with the methacrylic acid ester monomer contained in the methacrylic resin composition include an acrylic acid ester monomer represented by the following general formula (2):

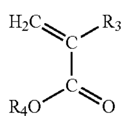
(2)

In the general formula (2), $R_3$ represents a hydrogen atom, and $R_4$ represents an alkyl group having 1 to 18 carbon atoms.

Examples of the acrylic acid ester monomer represented by the general formula (2) include, but are not limited to, methyl acrylate, ethyl acrylate, n-propyl acrylate, n-butyl acrylate, sec-butyl acrylate, and 2-ethylhexyl acrylate. Methyl acrylate, ethyl acrylate, and n-butyl acrylate are preferred, and methyl acrylate is more preferred because of its easy availability.

Examples of the additional vinyl monomer, other than the acrylic acid ester monomer of the general formula (2), copolymerizable with the methacrylic acid ester monomer include, but are not limited to: α,β-unsaturated acids such as acrylic acid and methacrylic acid; unsaturated group-containing divalent carboxylic acids such as maleic acid, fumaric acid, itaconic acid, and cinnamic acid, and their alkyl esters; styrene monomers such as styrene, o-methylstyrene, m-methylstyrene, p-methylstyrene, 2,4-dimethylstyrene, 2,5-dimethylstyrene, 3,4-dimethylstyrene, 3,5-dimethylstyrene, p-ethylstyrene, m-ethylstyrene, o-ethylstyrene, p-tert-butylstyrene, and isopropenylbenzene(α-methylstyrene); aromatic vinyl compounds such as 1-vinylnaphthalene, 2-vinylnaphthalene, 1,1-diphenylethylene, isopropenyltoluene, isopropenylethylbenzene, isopropenylpropylbenzene, isopropenylbutylbenzene, isopropenylpentylbenzene, isopropenylhexylbenzene, and isopropenyloctylbenzene; vinyl cyanide compounds such as acrylonitrile and methacrylonitrile; unsaturated carboxylic anhydrides such as maleic anhydride and itaconic anhydride; maleimide and N-substituted maleimides such as N-methylmaleimide, N-ethylmaleimide, N-phenylmaleimide, and N-cyclohexylmaleimide; amides such as acrylamide and methacrylamide; monomers of ethylene glycol or oligomers thereof whose both terminal hydroxy groups have been esterified with acrylic acid or methacrylic acid, such as ethylene glycol di(meth)acrylate, diethylene glycol di(meth)acrylate, triethylene glycol di(meth)acrylate, and tetraethylene glycol di(meth)acrylate; monomers of alcohols whose two hydroxy groups have been esterified with acrylic acid or methacrylic acid, such as neopentyl glycol di(meth)acrylate and di(meth)acrylate; monomers of polyhydric alcohol derivatives, such as trimethylolpropane and pentaerythritol, esterified with acrylic acid or methacrylic acid; and polyfunctional monomers such as divinylbenzene.

In the methacrylic resin composition contained in the lens molded article of the vehicle lamp of the present embodiment, a vinyl monomer other than the vinyl monomers listed above may be appropriately added and copolymerized for the purpose of improving properties such as heat resistance and workability.

Only one of these acrylic acid ester monomers copolymerizable with the methacrylic acid ester monomer or vinyl monomers other than the acrylic acid ester monomers listed above may be used alone, or two or more thereof may be used in combination.

The vinyl monomer used may be the same as or different from that in a polymer (1) and a polymer (2) mentioned later.

The content of the aforementioned unit of the additional vinyl monomer copolymerizable with the methacrylic acid ester monomer constituting the methacrylic resin composition is 0.1 to 30% by mass in the methacrylic resin composition.

The content of 0.1% by mass or larger is necessary for improving flowability and heat resistance. The content of 30% by mass or smaller is necessary for enhancing heat resistance.

The content is preferably 0.1 to 25% by mass, more preferably 0.1 to 20% by mass, further preferably 0.1 to 15% by mass, still further preferably 0.1 to 10% by mass.

<MFR-1 of Methacrylic Resin Composition>

In the methacrylic resin composition contained in the lens molded article constituting the vehicle lamp of the present embodiment, the mass (MFR-1) of the methacrylic resin composition emitted according to the ISO1133 standard under conditions involving a temperature of 230° C. and a load of 3.8 kg for 10 minutes is 0.2 g/10 min or larger and smaller than 12 g/10 min.

When the MFR-1 is 0.2 g/10 min or larger, favorable moldability is obtained in the lens molded article and the generation of undesirable short shot or warpage can be effectively prevented.

A material having more favorable flowability is preferred for forming the lens molded article. When the MFR-1 is smaller than 12 g/10 min, a sufficient molecular weight can be secured, high heat resistance can be achieved, and deformation caused by the heat of a lamp can be prevented. Excellent solvent resistance is obtained by securing more sufficient molecular weight.

The range of MFR-1 of the methacrylic resin composition is preferably 0.2 g/10 min or larger and smaller than 10 g/10 min, more preferably 0.3 g/10 min or larger and smaller than 8 g/10 min.

The MFR-1 of the methacrylic resin composition can be controlled within the numerical range described above by adjusting the composition and weight-average molecular weights of the methacrylic acid ester monomer unit and the unit of at least one additional vinyl monomer copolymerizable with the methacrylic acid ester monomer, and can be measured by a method described in Examples mentioned later.

<MFR Ratio of Methacrylic Resin Composition>

In the methacrylic resin composition contained in the lens molded article constituting the vehicle lamp of the present embodiment, when the mass of the methacrylic resin composition emitted according to the ISO1133 standard under conditions involving a temperature of 230° C. and a load of 10 kg for 10 minutes is defined as MFR-2, an MFR ratio determined according to the formula (1) given below is 4.5 or more. This can achieve both welding strength and solvent resistance.

$$\text{MFR ratio}=(\text{MFR-2})/(\text{MFR-1}) \quad (1)$$

Reduced warpage in molded articles is effective for enhancing welding strength. The reduced warpage allows resins to be kept in close contact and firmly welded.

For reducing warpage in molded articles, it is necessary to improve resin flowability. However, in general, decrease in molecular weight has heretofore been practiced in order to improve flowability, resulting in reduction in solvent resistance. Thus, for previous resins, it is difficult to achieve both welding strength and solvent resistance.

In the present embodiment, both welding strength and solvent resistance can be achieved by setting the MFR ratio (MFR-2/MFR-1) of the methacrylic resin composition to 4.5 or more.

The MFR ratio is preferably 4.8 or more, more preferably 5.0 or more, further preferably 5.5 or more.

The MFR-2 of the methacrylic resin composition can be measured by a method described in Examples mentioned later, and the MFR ratio can be calculated, together with the MFR-1.

For satisfying the MFR ratio of the formula (1) by the MFR-2 of the methacrylic resin composition based on the MFR-1, it is effective to adjust the composition and weight-average molecular weights of the methacrylic acid ester monomer unit and the unit of at least one additional vinyl monomer copolymerizable with the methacrylic acid ester, or to appropriately mix a polymer in which the composition or the weight-average molecular weights have been adjusted.

<Vicat Softening Temperature of Methacrylic Resin Composition>

The methacrylic resin composition contained in the lens molded article constituting the vehicle lamp of the present embodiment has a Vicat softening temperature of preferably 98° C. or higher. This is preferred because deformation caused by heat generated from a lamp can be prevented.

The Vicat softening temperature is more preferably 99° C. or higher, further preferably 100° C. or higher.

The Vicat softening temperature of the methacrylic resin composition is synonymous with the Vicat softening temperature of the lens molded article constituting the vehicle lamp of the present embodiment and can be measured by a method for measuring the Vicat softening temperature of the lens molded article, described in Examples mentioned later.

The Vicat softening temperature of the methacrylic resin composition can be controlled by adjusting the composition of the methacrylic acid ester monomer unit and the unit of at least one additional vinyl monomer copolymerizable with the methacrylic acid ester monomer.

<Weight-Average Molecular Weight of Methacrylic Resin Composition>

The weight-average molecular weight of the methacrylic resin composition contained in the lens molded article constituting the vehicle lamp of the present embodiment will be described.

The methacrylic resin composition has a weight-average molecular weight (Mw) of 90000 to 250000 measured by GPC (gel permeation chromatography).

When the weight-average molecular weight of the methacrylic resin composition is 90000 or larger, excellent mechanical strength is obtained in the vehicle lamp and the lens molded article of the present embodiment.

When the weight-average molecular weight (Mw) of the methacrylic resin composition is 250000 or smaller, excellent flowability is obtained.

When the weight-average molecular weight of the methacrylic resin composition falls within the range described above, excellent flowability in the molded article process is obtained.

The weight-average molecular weight (Mw) of the methacrylic resin composition is preferably 90000 to 240000, more preferably 90000 to 230000, further preferably 95000 to 220000, in consideration of the balance between flowability and mechanical strength.

The weight-average molecular weight (Mw) of the methacrylic resin composition can be measured by a method described in Examples mentioned later.

<Material for Use in Lens Molded Article>

The material for use in the lens molded article constituting the vehicle lamp of the present embodiment is preferably a material that is penetrated by 30% or more, more preferably 40% or more, further preferably 50% or more, of some wavelengths of laser lights in the range of 700 to 1600 nm.

The material for use in the lens molded article of the present embodiment contains the methacrylic resin composition mentioned above and may additionally contain a polycarbonate (PC) resin, a polystyrene resin, a polyethylene terephthalate (PET) resin, a polybutylene terephthalate (PBT) resin, an acrylonitrile-butadiene-styrene (ABS) resin, an acrylonitrile-styrene (AS) resin, a polyamide resin, a vinyl chloride resin, a polypropylene resin, or the like. The material may preferably contain a methacrylic resin, a polycarbonate resin, or a polystyrene resin and more preferably contain a methacrylic resin or a polycarbonate resin.

Only one of these resins may be used alone, or two or more thereof may be used in combination.

[Housing Molded Article]

The vehicle lamp of the present embodiment is constituted by, as described above, the lens molded article and a housing molded article.

<Material for Use in Housing Molded Article>

The housing molded article preferably comprises at least any one resin selected from the group consisting of an ASA resin (acrylonitrile-styrene-acrylic resin), an ABS resin (acrylonitrile-styrene-butadiene resin), an AES resin (acrylonitrile-(ethylene-propylene-diene)-styrene resin), a SAS resin (silicone composite rubber-acrylonitrile-styrene resin), and an ACS resin (acrylonitrile-chlorinated polyethylene-styrene (ACS) resin).

The material for use in the housing molded article is preferably a material that generates heat by absorbing some wavelengths of laser lights in the range of 700 to 1600 nm.

The material for use in the housing molded article may contain, in addition to the ABS resin, the ASA resin, the AES resin, the ACS resin, and the SAS resin, a polystyrene resin, an AS resin, a PET resin, a PBT resin, an alloy of a polycarbonate resin and an ABS resin, a polyamide resin, a vinyl chloride resin, a polycarbonate resin, a polypropylene resin, or the like.

The housing molded article is required to have both strength and weather resistance. The housing molded article preferably contains at least one of an ABS resin, an ASA resin, an AES resin, an ACS resin, and a SAS resin and more preferably, additionally contains a polystyrene resin. An ASA resin is further preferred.

Only one of these resins may be used alone, or two or more of the resins may be used in combination.

The housing molded article may contain a laser light absorber and a colorant.

<MFR-3 of Material for Use in Housing Molded Article>

In the resin for use in the housing molded article constituting the vehicle lamp of the present embodiment, the mass (MFR-3) of the resin emitted according to the ISO1133 standard under conditions involving a temperature of 220° C. and a load of 10 kg for 10 minutes is in the range of 2 g/10 min or larger and 45 g/10 min or smaller.

When the MFR-3 is 2 g/10 min or larger, favorable moldability is obtained and the generation of undesirable short shot or warpage can be effectively prevented.

A material having more favorable flowability is preferably used for forming the housing molded article. For enhancing resin flowability, it is generally necessary to decrease the molecular weight of the resin or to reduce heat resistance.

However, a molecular weight decreased too much is not preferred because solvent resistance or strength is reduced more than necessary.

A decreased content of a rubber component is also effective for improvement in flowability. However, this reduces solvent resistance or strength. Therefore, it is necessary to set the amount of a rubber according to required properties.

Accordingly, from these viewpoints, the MFR-3 in the present embodiment is 45 g/10 min or smaller. This has achieved all of favorable heat resistance, solvent resistance, and strength.

The range of the MFR-3 of the resin for use in the housing molded article is preferably 3 g/10 min or larger and smaller than 40 g/10 min, more preferably 4 g/10 min or larger and smaller than 35 g/10 min, further preferably 5 g/10 min or larger and smaller than 30 g/10 min.

The MFR-3 of the material for use in the housing molded article can be measured by a method described in Examples mentioned later.

For controlling the MFR-3 of the material for use in the housing molded article within the numerical range described above, it is effective to adjust the component or weight-average molecular weight of the resin material, the amount of a rubber component, etc.

<Vicat Softening Temperature of Resin for Use in Housing Molded Article>

The resin for use in the housing molded article constituting the vehicle lamp of the present embodiment has a Vicat softening temperature of preferably 96° C. or higher.

When the Vicat softening temperature is 96° C. or higher, the deformation of the housing molded article caused by heat generated from a lamp can be prevented. The Vicat softening temperature is more preferably 98° C. or higher, further preferably 100° C. or higher.

The Vicat softening temperature of the resin for use in the housing molded article is synonymous with the Vicat softening temperature of the housing molded article and can be measured by a method for measuring the Vicat softening temperature of the housing molded article, described in Examples mentioned later.

<Temperature Difference in Vicat Softening Temperature Between Lens Molded Article and Housing Molded Article>

The difference in Vicat softening temperature between the lens molded article and the housing molded article constituting the vehicle lamp of the present embodiment is preferably 30° C. or less.

When the lens molded article and the housing molded article have closer heat resistance, specifically, differ in Vicat softening temperature by 30° C. or less, the resins are more strongly entangled during laser welding so that welding strength tends to be higher.

This has another advantage that the welding time can be shortened because their softening timings are close.

The difference in Vicat softening temperature between the lens molded article and the housing molded article is more preferably 23° C. or less, further preferably 15° C. or less, still further preferably 10° C. or less.

The temperature difference in Vicat softening temperature between the lens molded article and the housing molded article can be controlled by adjusting the composition or weight-average molecular weights of the resin materials constituting the lens molded article and the housing molded article, the amount of a rubber component, etc.

<Difference in Coefficient of Linear Expansion Between Lens Molded Article and Housing Molded Article>

The difference in coefficient of linear expansion between the lens molded article and the housing molded article constituting the vehicle lamp of the present embodiment is preferably 2.5 (/° C.) or less.

When the lens molded article and the housing molded article have closer coefficients of linear expansion, specifically, the difference in coefficient of linear expansion between the molded articles is 2.5 (/° C.) or less, cooling strain is less likely to occur during cooling so that welding strength tends to be higher.

This has another advantage that, even if an ambient temperature is changed after welding, strain in the welded portion is not suddenly increased because of the close coefficients of expansion of the lens molded article and the housing molded article.

The difference in coefficient of linear expansion between the lens molded article and the housing molded article is more preferably 2.0 (/° C.) or less, further preferably 1.5 (/° C.) or less, still further preferably 1.2 (/° C.) or less.

The difference in coefficient of linear expansion between the lens molded article and the housing molded article can be controlled by adjusting the components or weight-average molecular weights of the resin materials, the amount of a rubber component, etc.

<Smoking During Laser Welding>

The vehicle lamp comprising the lens molded article and the housing molded article laser-welded to each other may smoke during the laser welding.

One of the causes of the smoking is the insufficient heat-resistant stability of the housing molded article, which generates heat in response to laser light.

The insufficient heat-resistant stability of the housing molded article may cause the decomposition of resins during laser heating, generating smoke. Thus, a material having low heat-resistant stability is considered to easily generate smoke during laser welding.

In light of these points, the rate of decrease in the mass of the housing molded article constituting the vehicle lamp of the present embodiment is preferably 1.5% or less, more preferably 1.0% or less, further preferably 0.7% or less, due to heating at 260° C. for 30 minutes.

The rate of decrease in the mass of the housing molded article due to heating at 260° C. for 30 minutes can be controlled by adjusting the composition or weight-average molecular weight of the resin material constituting the housing component, the amount of a rubber component, etc.

(Method for Producing Methacrylic Resin Composition)

Hereinafter, the method for producing the methacrylic resin composition serving as the material for the lens molded article constituting the vehicle lamp of the present embodiment mentioned above will be described. However, the method for producing the methacrylic resin composition of the present embodiment is not limited to methods shown below.

The methacrylic resin composition can be produced by a bulk polymerization method, a solution polymerization method, a suspension polymerization method, or an emulsion polymerization method.

Preferably, a bulk polymerization method, a solution polymerization method, or a suspension polymerization method is used. More preferably, a solution polymerization method or a suspension polymerization method is used. Further preferably, a suspension polymerization method is used.

Specific examples of the method for producing the methacrylic resin composition of the present embodiment include the following methods:

<First Method>

A predetermined amount of a polymer (1) having a predetermined weight-average molecular weight (e.g., 5000 to 50000) is produced in advance. The polymer (1) is mixed with a raw material composition mixture of a polymer (2) having a weight-average molecular weight (e.g., 60000 to 350000) different from that of the polymer (1). The mixed solution is polymerized to produce a methacrylic resin composition.

<Second Method>

A polymer (1) having a predetermined weight-average molecular weight (e.g., 5000 to 50000) is produced in advance. Then, a predetermined amount of a raw material composition mixture of a polymer (2) having a weight-average molecular weight (e.g., 60000 to 350000) different from that of the polymer (1) is supplementarily added in succession to the polymer (1), or the polymer (1), together with a polymerization solution, is supplementarily added in succession to the raw material composition mixture of the polymer (2). The mixed solution is polymerized to produce a methacrylic resin composition.

<Third Method>

A polymer (1) and a polymer (2) having a molecular weight different from that of the polymer (1) are individually produced in advance and blended to produce a methacrylic resin composition.

The forms of blendable resins are not particularly limited. For example, resin beads after suspension polymerization or emulsion polymerization, resins in a melted state, or pellets after granulation are blendable.

The weight-average molecular weight of the polymer (1) is preferably a weight-average molecular weight of 5000 to 50000 measured by gel permeation chromatography, from the viewpoint of suppressing molded article defects such as silver and conferring polymerization stability and flowability. The weight-average molecular weight is more preferably 10000 to 50000, further preferably 10000 to 40000.

The weight-average molecular weight of the polymer (2) is preferably 60000 to 350000 from the viewpoint of mechanical strength and flowability. The weight-average molecular weight is more preferably 70000 to 320000, further preferably 80000 to 300000, still further preferably 90000 to 300000.

A polymerization initiator may be used in the polymerization step for the production of the methacrylic resin composition of the present embodiment, for the purpose of adjusting the degree of polymerization for the polymer to be produced.

Examples of the polymerization initiator can include, but are not limited to: organic peroxides such as di-t-butyl peroxide, lauroyl peroxide, stearyl peroxide, benzoyl peroxide, t-butyl peroxyneodecanoate, t-butyl peroxypivalate, dilauroyl peroxide, dicumyl peroxide, t-butyl peroxy-2-ethylhexanoate, 1,1-bis(t-butylperoxy)-3,3,5-trimethylcyclohexane, and 1,1-bis(t-butylperoxy)cyclohexane; and general azo radical polymerization initiators such as azobisisobutyronitrile, azobisisovaleronitrile, 1,1-azobis(1-cyclohexanecarbonitrile), 2,2'-azobis-4-methoxy-2,4-azobisisobutyronitrile, 2,2'-azobis-2,4-dimethylvaleronitrile, and 2,2'-azobis-2-methylbutyronitrile.

Only one of these polymerization initiators may be used alone, or two or more types thereof may be used in combination.

Any of these radical polymerization initiators may be combined with an appropriate reducing agent and used as a redox initiator in the polymerization step.

These polymerization initiators are generally used in the range of 0 to 1 part by mass with respect to 100 parts by mass in total of all monomers for use in the polymerization step. The amount of the polymerization initiator used can be appropriately selected in consideration of the temperature at which the polymerization is performed, and the half-life of the polymerization initiator.

In the case of selecting a bulk polymerization method, a cast polymerization method, or a suspension polymerization method to carry out the polymerization step, a peroxide initiator such as lauroyl peroxide, decanoyl peroxide, or t-butyl peroxy-2-ethylhexanoate can be particularly preferably used, and lauroyl peroxide is particularly preferably used, from the viewpoint that the staining of the methacrylic resin composition can be prevented.

For performing the polymerization step by the solution polymerization method at a high temperature of 90° C. or higher, it is preferred to use, for example, a peroxide or azobis initiator that has a 10-hour half-life temperature of 80° C. or higher and is soluble in the organic solvent used.

Examples of such a peroxide or azobis initiator can include, but are not limited to, 1,1-bis(t-butylperoxy)-3,3,5-trimethylcyclohexane, cyclohexane peroxide, 2,5-dimethyl-2,5-di(benzoylperoxy)hexane, 1,1-azobis(1-cyclohexanecarbonitrile), and 2-(carbamoylazo)isobutyronitrile.

The polymerization initiator mentioned above is preferably used in the range of 0 to 1 part by mass with respect to 100 parts by mass in total of all monomers used.

In the production step of the methacrylic resin composition of the present embodiment, the molecular weight of the polymer to be produced can be controlled without impairing the object of the present invention.

The molecular weight can be controlled by using, for example, a chain transfer agent such as an alkylmercaptan, dimethylacetamide, dimethylformamide, or triethylamine, and an iniferter such as a dithiocarbamate, triphenylmethylazobenzene, or a tetraphenylethane derivative.

The molecular weight can be adjusted by adjusting the amounts of these agents added.

In the case of using these additives, an alkylmercaptan is preferably used from the viewpoint of handleability and stability. Examples of the alkylmercaptan include, but are not limited to, n-butylmercaptan, n-octylmercaptan, n-dodecylmercaptan, t-dodecylmercaptan, n-tetradecylmercaptan, n-octadecylmercaptan, 2-ethylhexyl thioglycolate, ethylene glycol dithioglycolate, trimethylolpropane tris(thioglycolate), and pentaerythritol tetrakis(thioglycolate).

These agents can be appropriately added according to the desired molecular weight and are generally used in the range of 0.001 parts by mass to 3 parts by mass with respect to 100 parts by mass in total of all monomers used.

Other examples of the method for controlling the molecular weight include a method of changing the polymerization method, a method of adjusting the amount of the polymerization initiator, and a method of changing the polymerization temperature.

Only one of these methods for controlling the molecular weight may be used alone, or two or more of these methods may be used in combination.

The polymerization temperature can be appropriately selected, for production, as the optimum polymerization temperature for the polymerization method and is preferably 50° C. or higher and 200° C. or lower.

Each of (First method) to (Third method) mentioned above is a method for producing a methacrylic resin composition comprising two types of components differing in weight-average molecular weight as constituents. In the method for producing the methacrylic resin composition of the present embodiment, a polymer (3), a polymer (4), or the like differing therefrom in molecular weight or composition may be further produced by similar procedures and combined with the polymers (1) and (2).

A method which involves producing the polymer (1) in advance, and producing the polymer (2) in a state where the polymer (1) exists in the raw material composition mixture of the polymer (2) is a method preferred as the method for producing the methacrylic resin composition of the present embodiment.

This method is preferred because the method easily controls the composition of each of the polymer (1) and the polymer (2), suppresses a rise in temperature caused by heat generated during polymerization, and can stabilize the internal viscosity of the system.

In this case, the raw material composition mixture of the polymer (2) may be in a state where the polymerization of a portion thereof has already been started. The polymerization method therefor is preferably any of bulk polymerization, solution polymerization, suspension polymerization, and emulsion polymerization methods, more preferably a bulk polymerization, solution polymerization, or suspension polymerization method.

<Mixing Ratio Between Polymers (1) and (2)>

Next, the specific mixing ratio between the polymer (1) and the polymer (2) mentioned above will be described as to the method for producing the methacrylic resin composition of the present embodiment.

In the description below, both of the polymer (1) and the polymer (2) are methacrylic acid ester polymers comprising methacrylic acid ester monomers as polymerization raw materials.

In both of (First method) and (Second method) described above, methacrylic acid ester monomers, or a methacrylic acid ester monomer and at least one additional vinyl monomer copolymerizable with the methacrylic acid ester are polymerized at the first stage of the polymerization step to obtain a methacrylic acid ester polymer (polymer (1)). Methacrylic acid ester monomers, or a methacrylic acid ester monomer and at least one additional vinyl monomer copolymerizable with the methacrylic acid ester are polymerized at the second stage of the polymerization step to obtain a methacrylic acid ester polymer (polymer (2)).

The mixing ratio therebetween is preferably 5 to 50% by mass of the polymer (1) and 95 to 50% by mass of the polymer (2).

The mixing ratio described above is preferred because polymerization stability can be achieved in the production step and also from the viewpoint of the flowability, moldability, and mechanical strength of the methacrylic resin composition.

The polymer (1)/polymer (2) ratio is more preferably 5 to 45% by mass/95 to 55% by mass, further preferably 6 to 40% by mass/94 to 60% by mass, still further preferably 7 to 38% by mass/93 to 62% by mass, for obtaining more favorable balance among these properties.

In the case of supplementing a methacrylic acid ester monomer with an additional vinyl monomer as raw materials for the polymer (1), the compositional ratio between the methacrylic acid ester monomer and the additional vinyl monomer is preferably 20 to 0% by mass of the additional vinyl monomer with respect to 80 to 100% by mass of the methacrylic acid ester monomer, more preferably methacrylic acid ester monomer/additional vinyl monomer=85 to 100% by mass/15 to 0% by mass, further preferably 90 to 100% by mass/10 to 0% by mass, from the viewpoint of the color tone of the resulting polymer.

If polymerization stability must be taken into particular consideration, it is preferred that the amount of the additional vinyl monomer copolymerizable with the methacrylic acid ester, added for the polymer (1) should be substantially zero. In this respect, the amount of the additional vinyl monomer present as impurities in the raw material methacrylic acid ester monomer is acceptable.

In the case of supplementing a methacrylic acid ester monomer with an additional vinyl monomer as raw materials for the polymer (2), the compositional ratio between the methacrylic acid ester monomer and the additional vinyl monomer is preferably methacrylic acid ester monomer/additional vinyl monomer compositional ratio=70 to 99.5% by mass/30 to 0.5% by mass, more preferably 80 to 99.5% by mass/20 to 0.5% by mass, further preferably 85 to 99.5% by mass/15 to 0.5% by mass, still further preferably 90 to 99.5% by mass/10 to 0.5% by mass, from the viewpoint of the heat stability of the resulting polymer.

(Additive for Methacrylic Resin Composition, and colorant)

<Additive>

The methacrylic resin composition constituting the vehicle lamp of the present embodiment may be supplemented with a predetermined additive from the viewpoint of conferring various properties such as rigidity and dimensional stability.

Examples of the additive include, but are not limited to: plasticizers such as phthalic acid ester, fatty acid ester, trimellitic acid ester, phosphoric acid ester, and polyester; mold release agents such as higher fatty acid, higher fatty acid ester, and mono-, di-, or triglyceride of higher fatty acid; antistatic agents such as polyether, polyether ester, polyether ester amide, alkyl sulfonate, and alkyl benzenesulfonate; stabilizers such as antioxidants, ultraviolet absorber, heat stabilizers, and light stabilizers; and others such as flame retardants, flame retardant promoters, curing agents, curing accelerators, conductivity-imparting agents, stress releasers, crystallization accelerators, hydrolysis inhibitors, lubricants, impact modifiers, slidability-improving agents, compatibilizing agents, nucleating agents, toughening agents, strengthening agents, flow adjusters, dyes, sensitizing materials, pigments for coloring, rubber polymers, thickeners, antisettling agents, anti-sagging agents, fillers, antifoaming agents, coupling agents, anticorrosive agents, antibacterial or antifungal agents, anti-fouling agents, and conductive polymers.

Examples of the heat stabilizer include, but are not limited to, antioxidants such as hindered phenol antioxidants and phosphorus processing stabilizers. A hindered phenol antioxidant is preferred.

Examples of the heat stabilizer include, but are not limited to, pentaerythritol tetrakis[3-(3,5-di-tert-butyl-4-hydroxyphenyl)propionate], thiodiethylenebis[3-(3,5-di-tert-butyl-4-hydroxyphenyl)propionate], octadecyl-3-(3,5-di-tert-butyl-4-hydroxyphenyl)propionate, 3,3',3",5,5',5"-hexa-tert-butyl-a,a',a"-(mesitylene-2,4,6-triyl)tri-p-cresol, 4,6-bis(octylthiomethyl)-o-cresol, 4,6-bis(dodecylthiomethyl)-o-cresol, ethylenebis(oxyethylene)bis[3-(5-tert-butyl-4-hydroxy-m-tolyl)propionate], hexamethylenebis[3-(3,5-di-tert-butyl-4-hydroxyphenyl)propionate], 1,3,5-tris(3,5-di-tert-butyl-4-hydroxybenzyl)-1,3,5-triazine-3-hydroxy-2,6-xyline)methyl]-1,3,5-triazine-2,4,6(1H,3H,5H)-trione, and 2,6-di-tert-butyl-4-(4,6-bis(octylthio)-1,3,5-triazin-2-ylamine)phenol.

Particularly, pentaerythritol tetrakis[3-(3,5-di-tert-butyl-4-hydroxyphenyl)propionate] is preferred.

Only one of these heat stabilizers may be used alone, or two or more thereof may be used in combination.

Examples of the ultraviolet absorber include, but are not limited to, benzotriazole compounds, benzotriazine compounds, benzoate compounds, benzophenone compounds, oxybenzophenone compounds, phenol compounds, oxazole compounds, malonic acid ester compounds, cyanoacrylate compounds, lactone compounds, salicylic acid ester compounds, and benzoxazinone compounds. A benzotriazole compound or a benzotriazine compound is preferred.

Only one of these ultraviolet absorbers may be used alone, or two or more thereof may be used in combination.

In the case of adding the ultraviolet absorber, its vapor pressure (P) at 20° C. is preferably $1.0\times10^{-4}$ Pa or lower, more preferably $1.0\times10^{-6}$ Pa or lower, further preferably $1.0\times10^{-8}$ Pa or lower, from the viewpoint of molded article processability.

The excellent molded article processability means that, for example, the ultraviolet absorber is less attached to a roll during film formation. The ultraviolet absorber attached to a roll might deteriorate, for example, appearance or optical properties due to its attachment to molded article surface and is therefore not preferred when the molded article is used as an optical material.

The melting point (Tm) of the ultraviolet absorber is preferably 80° C. or higher, more preferably 100° C. or higher, further preferably 130° C. or higher, still further preferably 160° C. or higher.

The rate of decrease in the mass of the ultraviolet absorber by heating from 23° C. to 260° C. at a rate of 20° C./min is preferably 50% or less, more preferably 30% or less, further preferably 15% or less, still further preferably 10% or less, still further preferably 5% or less.

<Colorant>

The methacrylic resin composition constituting the vehicle lamp of the present embodiment may be supplemented with carbon black, various pigments, a colorant, or the like in a range where the transmittance of laser light exceeds 30%.

Examples of the colorant include, but are not limited to, perylene dyes, perinone dyes, pyrazolone dyes, methine dyes, coumarin dyes, quinophthalone dyes, quinoline dyes, anthraquinone dyes, anthrapyridone dyes, thioindigo dyes, coumarin-based dyes, isoindolinone pigments, diketo-pyrrolo-pyrrole pigments, condensed azo pigments, benzimidazolone pigments, dioxazine pigments, copper phthalocyanine pigments, quinacridone pigments, nickel complex compounds, carbon black, titanium black, titanium dioxide, alumina oxide, aluminum hydroxide, silicic acid, zinc oxide, zinc stearate, magnesium stearate, calcium stearate, aluminum stearate, barium sulfate, polymethylsilsesquioxane, halogenated copper phthalocyanine, ethylene bis-stearamide, ultramarine blue, ultramarine violet, iron oxide, silicon dioxide, mica, talc, liquid paraffin, and magnesium silicate.

Only one of these colorants may be used alone, or two or more thereof may be used in combination.

<Method for Kneading Additive and Other Resins>

The methacrylic resin composition may be mixed with other predetermined resins, if necessary, in addition to the additive and the colorant mentioned above.

Examples of a kneading method for mixing the methacrylic resin composition with the additive, the colorant, and other resins include, but are not limited to, a kneading method using a kneading machine such as an extruder, a heat roll, a kneader, a roller mixer, or a Banbury mixer.

Among them, kneading using an extruder is preferred in terms of productivity.

The kneading temperature can follow the preferred processing temperatures of the polymers constituting the methacrylic resin composition and other resins to be mixed therewith and is in the range of 140 to 300° C., preferably in the range of 180 to 280° C., as a guideline.

<Laser Light Absorber>

The vehicle lamp of the present embodiment is constituted by the lens molded article and the housing molded article joined to each other by laser welding.

The methacrylic resin composition constituting the lens molded article preferably contains a laser light absorber.

Examples of the laser light absorber that can be used include, but are not limited to, pigments such as carbon black, titanium black, and black iron oxide, and various colorants.

Only one of these laser light absorbers may be used alone, or two or more thereof may be used in combination.

The laser absorber can be mixed into the methacrylic resin composition in the same way as <Method for kneading additive and other resins> mentioned above.

These laser light absorbers may be added as the colorant mentioned above.

The proportion of the laser light absorber is preferably 0.01 to 10% by mass, more preferably 0.1 to 5% by mass, further preferably 0.1 to 3% by mass, in the methacrylic resin composition.

[Method for Producing Vehicle Lamp]

The vehicle lamp of the present embodiment can be produced by respectively forming the lens molded article and the housing molded article mentioned above, and joining these molded articles by laser welding.

<Method for Producing Lens Molded Article>

The lens molded article can be produced by injection molded article using a predetermined injection molded article machine.

<Method for Producing Housing Molded Article>

The housing molded article can be produced by injection molded article using a predetermined injection molded article machine.

<Type of Laser>

The wavelength of the laser for use in the laser welding is preferably in the range of 700 to 1600 nm. Specific examples of the wavelength of the laser include 700 to 980 nm for semiconductor laser, 700 to 1550 nm for YAG laser, and 900 to 1550 nm for fiber laser.

<Laser Welding Strength>

The vehicle lamp of the present embodiment comprising the lens molded article and the housing molded article laser-welded to each other has high welding strength.

If the vehicle lamp does not have sufficient welding strength, the lens molded article and the housing molded article are broken to be peeled apart when pulled in a direction where the lens molded article and the housing molded article are detached from each other. Since the vehicle lamp of the present embodiment has high welding strength, each material is broken without peeling apart the lens molded article and the housing molded article.

The welding strength can be evaluated by confirming the breaking status at the time of destruction and can be specifically evaluated by a method described in Examples mentioned later.

EXAMPLES

Hereinafter, the present invention will be described in detail with reference to specific Examples and Comparative Examples. However, the present invention is not intended to be limited by these Examples.

[Raw Material]

(Raw Material for Use in Lens Molded Article)

Methyl methacrylate (MMA): manufactured by Asahi Kasei Chemicals Corp. (supplemented with 2.5 ppm of 2,4-di-methyl-6-tert-butylphenol manufactured by CBC Co., Ltd. as a polymerization inhibitor)

Methyl acrylate (MA): manufactured by Mitsubishi Chemical Corp. (supplemented with 14 ppm of 4-methoxyphenol manufactured by Kawaguchi Chemical Industry Co., Ltd. as a polymerization inhibitor)

n-Octylmercaptan: manufactured by Arkema, Inc.

2-Ethylhexyl thioglycolate: manufactured by Arkema, Inc.

Lauroyl peroxide: manufactured by NOF Corp.

Calcium phosphate: manufactured by Nippon Chemical Industrial Co., Ltd., used as a suspending agent Calcium carbonate: manufactured by Shiraishi Kogyo Kaisha, Ltd., used as a suspending agent Sodium lauryl sulfate: manufactured by Wako Pure Chemical Industries, Ltd., used as a suspension aid Ethyl acrylate (EA): manufactured by Wako Pure Chemical Industries, Ltd.

Styrene (St): manufactured by Asahi Kasei Chemicals Corp.

N-Phenylmaleimide (PMI): manufactured by Nippon Shokubai Co., Ltd.

(Raw Material for Use in Housing Molded Article)

Resin A: Techno ASA AW553HS (manufactured by TechnoPolymer Co., Ltd., ASA resin)

Resin B: DIALAC SK30 (manufactured by UMG ABS Ltd., AES resin)

Resin C: STYLAC ABS190 (manufactured by Asahi Kasei Chemicals Corp., ABS resin)

Resin D: DIALAC S411A (manufactured by UMG ABS Ltd., ASA resin)

[Measurement Method]

<I. Compositional Analysis of Methacrylic Resin Composition and Measurement of Molecular Weight>

(1) Compositional Analysis of Methacrylic Resin Composition

The compositional analysis of the methacrylic resin composition was conducted by GC (pyrolysis gas chromatography) and mass spectrometry.

Pyrolysis apparatus: Py-2020D manufactured by Frontier Laboratories Ltd.

Column: DB-1 (length: 30 m, inside diameter: 0.25 mm, liquid-phase thickness: 0.25 μm)

Column temperature program: kept at 40° C. for 5 min, then heated to 320° C. at a rate of 50° C./min, and kept at 320° C. for 4.4 min Pyrolytic furnace temperature: 550° C.

Column inlet temperature: 320° C.

Gas chromatography: GC6890 manufactured by Agilent Technologies, Inc.

Carrier: pure nitrogen, flow rate: 1.0 mL/min

Injection method: split method (split ratio: 1/200)

Detector: mass spectrometer Automass Sun manufactured by JEOL Ltd.

Detection method: electron impact ionization method (ion source temperature: 240° C., interface temperature: 320° C.)

Sample for measurement: 10 μL of a solution of 0.1 g of the methacrylic resin composition in 10 mL of chloroform The sample for measurement was collected into a platinum sample cup for the pyrolysis apparatus and dried in vacuum at 150° C. for 2 hours. Then, the sample cup was placed in the pyrolytic furnace, followed by the compositional analysis of the sample under the conditions described above.

The compositional ratio of the methacrylic resin composition was determined on the basis of the peak areas of methyl methacrylate and methyl acrylate on total ion chromatography (TIC) and a calibration curve of standard samples given below.

Preparation of standard samples for the calibration curve: 0.25 parts by mass of lauroyl peroxide and 0.25 parts by mass of n-octylmercaptan with respect to 100 parts by mass of a solution of methyl methacrylate and methyl acrylate were added to 50 g each of a total of 5 solutions having a ratio between methyl methacrylate and methyl acrylate of (methyl methacrylate/methyl acrylate)=(100% by mass/0% by mass), (98% by mass/2% by mass), (94% by mass/6% by mass), (90% by mass/10% by mass), and (80% by mass/20% by mass), respectively.

Each of these mixed solutions was placed in a 100-mL glass ampule, which was sealed after replacement of air with nitrogen.

The glass ampule was placed in a water bath of 80° C. for 3 hours and then in an oven of 150° C. for 2 hours.

After cooling to room temperature, the glass was broken, and the methacrylic resin composition was taken out thereof and subjected to the compositional analysis.

A graph of (Area value of methyl acrylate)/(Area value of methyl methacrylate+Area value of methyl acrylate) obtained by the measurement of the standard samples for the calibration curve and the charging ratio of methyl acrylate was used as the calibration curve.

The quantitative ratios of methyl methacrylate and other components in the methacrylic resin composition were analyzed using this calibration curve. The analysis results are shown in Table 3 below.

(2) Analysis of Weight-Average Molecular Weight (Mw) of Methacrylic Resin Composition The weight-average molecular weight (Mw) of the methacrylic resin composition was measured using an apparatus and conditions given below.

Measurement apparatus: gel permeation chromatography (HLC-8320GPC) manufactured by Tosho Corp.

Column: one TSK guard column SuperH-H column, two TSKgel SuperHM-M columns, and one TSKgel SuperH2500 column, connected in series for use These columns elute high-molecular-weight components first and elute low-molecular-weight components late.

Detector: RI (differential refractive) detector (Detection sensitivity: 3.0 mV/min)

Column temperature: 40° C.

Sample: a solution of 0.02 g of the methacrylic resin composition in 10 mL of tetrahydrofuran Injection volume: 10 μL Developing solvent: tetrahydrofuran, flow rate: 0.6 mL/min 0.1 g/L 2,6-di-t-butyl-4-methylphenol (BHT) was added as an internal standard.

Ten monodisperse polymethyl methacrylates having a known weight-average peak molecular weight and differing in molecular weight (Polymethyl methacrylate Calibration Kit PL2020-0101 M-M-10) given below were used as standard samples for the calibration curve.

| | Peak molecular weight (Mp) |
|---|---|
| Standard sample 1 | 1,916,000 |
| Standard sample 2 | 625,500 |
| Standard sample 3 | 298,900 |
| Standard sample 4 | 138,600 |
| Standard sample 5 | 60,150 |
| Standard sample 6 | 27,600 |
| Standard sample 7 | 10,290 |
| Standard sample 8 | 5,000 |
| Standard sample 9 | 2,810 |
| Standard sample 10 | 850 |

RI detection intensity at the elution time of the methacrylic resin composition was measured under the conditions described above.

The weight-average molecular weight (Mw) of the methacrylic resin composition was determined on the basis of areas in the GPC elution curve and the calibration curve of the approximate equation of the 7th order.

For a mixture of a polymer (1) and a polymer (2) mentioned later, the GPC elution curve of the polymer (1) alone was determined in advance, and its weight-average molecular weight was determined. The GPC elution curve of the polymer (1) was multiplied by the abundance ratio of the polymer (1) (in the present specification, the charging ratio was used), and detection intensity at the elution time was subtracted from the GPC elution curve of the mixture of the polymer (1) and the polymer (2) to obtain the GPC elution curve of the polymer (2) alone. The weight-average molecular weight (Mw) of the polymer (2) was determined therefrom.

The weight-average molecular weight (Mw) of the methacrylic resin composition is shown in Table 3 below, and the weight-average molecular weights of the polymer (1) and the polymer (2) are shown in Table 2 below.

<II. Physical, Property Measurement>

(1) Melt Flow Rate (MFR)

(1-1) MFR-1

The testing method was performed according to the ISO1133 standard.

Specifically, the mass of the resin emitted under conditions involving a heating temperature of 230° C. and a load of 3.8 kg for 10 minutes using a melt flow rate measurement apparatus specified by the ISO1133 standard was defined as MFR-1 and used as an index for a resin temperature for molded article.

This condition was applied to the methacrylic resin composition for use in the lens molded article.

(1-2) MFR-2

The testing method was performed according to the ISO1133 standard.

The mass of the methacrylic resin composition emitted under conditions involving a heating temperature of 230° C. and a load of 10 kg for 10 minutes using a melt flow rate measurement apparatus specified by the ISO1133 standard was used as the value of MFR-2.

This condition was applied to the methacrylic resin composition for use in the lens molded article.

(1-3) MFR-3

The testing method was performed according to the ISO1133 standard.

The mass of the resin emitted under conditions involving a heating temperature of 220° C. and a load of 10 kg for 10 minutes using a melt flow rate measurement apparatus specified by the ISO1133 standard was used as the value of MFR-3.

This condition was applied to the resin for use in the housing molded article.

(1-4) MFR Ratio

A value obtained by dividing MFR-2 by MFR-1 as shown in the following formula (1) was used as an MFR ratio.

$$\text{MFR ratio}=(\text{MFR-2})/(\text{MFR-1}) \quad (1)$$

(2) Test Specimen Formation

Molded articles for “amount of warpage”, “welding time”, “destruction test”, “solvent crack”, “Vicat softening temperature”, “heating test”, “coefficient of linear expansion”, and “test on the rate of decrease in amount after the heating test” mentioned later were produced by methods given below.

(2-1) Method for Forming Lens Molded Article

Molded article conditions for a ribbed plate corresponding to the lens molded article are shown below.

Molded article machine: EC100SX injection molded article machine manufactured by Toshiba Machine Co., Ltd.

Molded article: ribbed plate 1 (FIG. 1: schematic perspective view)

Top panel: W150×D100×t2 mm

Square-shaped rib portion: W130×D80×H10×t2 mm

Gate: one side gate

Criteria for setting of resin temperature

| MFR-1 (g/10 min): | resin temperature |
|---|---|
| Smaller than 1: | 260° C. |
| 1 or larger to smaller than 2: | 250° C. |
| 2 or larger to smaller than 4: | 240° C. |
| 4 or larger to smaller than 8: | 230° C. |
| 8 or larger: | 220° C. |

Resin temperature: described in Table 5

Mold temperature: 60° C.

Charging+pressure keeping time: 15 sec

Cooling time: 30 sec

Ribbed plate 1 was formed as the lens molded article shown in FIG. 1 under the conditions described above.

(2-2) Method for Forming Housing Molded Article

Molded article conditions for a plate corresponding to the housing molded article are shown below.

Molded article machine: EC100SX injection molded article machine manufactured by Toshiba Machine Co., Ltd.

Molded article: plate 2 (diagonally shaded area in FIG. 2: schematic side view)

Dimension: 150×100×2 mm

Molded article conditions: resin temperature and mold temperature

ASA resin and AES resin: according to JIS K6876-1 and -2

ABS resin: according to JIS K6934-1 and -2

Charging+pressure keeping time: 15 sec

Cooling time: 30 sec

Plate 2 was formed as the housing molded article under the conditions described above.

(3) Evaluation of Amount of Warpage

The ribbed plate 1 was formed as the lens molded article shown in FIG. 1 as mentioned above, and then left at 23° C. and 50% humidity for 24 hours or longer.

Then, the ribbed plate 1 was placed on a surface plate in a state where rib portion 8 faced downward.

In this state, the height of a portion having the largest clearance was measured using a clearance gauge.

As mentioned above, the plate 2 was formed as the housing molded article shown in the diagonally shaded area of FIG. 2 as mentioned above, and then left at 23° C. and 50% humidity for 24 hours or longer.

Then, the plate 2 was placed on a surface plate.

In this state, the height of a portion having the largest clearance was measured using a clearance gauge.

The amount of warpage in the housing molded article is shown in Table 4, and the amount of warpage in the lens molded article is shown in Table 5.

(4) Laser Welding Time

The housing molded article plate 2 was placed on a table of a laser welding machine, and the lens molded article ribbed plate 1 was placed at the central portion thereof in a state where the rib 8 faced downward.

The molded articles were pressed down with a transparent glass plate from above, and the entire perimeter along the rib was irradiated with laser several times from above according to irradiation conditions given below. The welding was confirmed to be completed when the amount of sinking caused by the welding reached 0.5 mm at welded portion 3.

FIG. 2 shows a schematic side view of post-welding test specimen 9, and FIG. 3 shows a schematic perspective view of the post-welding test specimen 9.

The time from the start of laser irradiation to the time when the amount of sinking reached 0.5 mm was defined as a welding time. The welding time (sec) is shown in Table 5 below.

<Laser Irradiation Conditions>

Laser welding machine: fiber laser welding machine (manufactured by IPG Inc.)

Wavelength: 1064 nm (5) Destruction Test (5-1) Cutting Method

The molded articles thus laser-welded in the paragraph (4) or the molded articles laser-welded under the same conditions as in the paragraph (4) except that the welding time was changed to 5 seconds were left at 23° C. and 50% humidity for 24 hours or longer.

Then, the post-laser welding test specimen 9 was cut at the positions indicated by broken lines A-A' and B-B' shown in FIG. 4(A) into 3 equal portions of 150 mm in long side and approximately 50 mm in width.

Next, one molded article of the 3 equal portions was cut in half at the position indicated by broken line C-C' shown in FIG. 4(B) to obtain welding strength test specimen 10 shown in FIG. 4(C).

(5-2) Method for Conducting Destruction Test

This welding strength test specimen 10 was used. The ribbed plate 1 and the plate 2 were pulled in the directions indicated by arrows D and E, respectively, shown in FIG. 5, and the destruction status of the welded portion 3 was observed.

As shown in FIGS. 6(A) to 6(C), the following 3 cases were evaluated according to criteria given below: interfacial delamination 4 occurred between the ribbed plate 1 and the plate 2; destroyed portion 5 arose on the plate 2 side of the housing portion; and destroyed portion 6 arose on the ribbed plate 1 side.

The evaluation results are shown in Table 5 below.

x: Interfacial delamination occurred at the welded portion.

○: Destruction occurred on the ribbed plate 1 side or on the plate 2 side.

(6) Solvent Crack Test

The molded articles laser-welded in the paragraph (4) were left at 23° C. and 50% humidity for 24 hours or longer.

The welded portion 3 shown in FIG. 2 was coated with shampoo & wax for automobiles (manufactured by Honda Access Corp.) and left for 2 hours.

Then, the crack generation status was confirmed.

As shown in FIGS. 7(A) to 7(D), the generation status of crack 7 that occurred on the ribbed plate 1 side was evaluated according to criteria given below.

The evaluation results are shown in Table 5 below.

◎: No crack, or only the welded portion 3 was cracked whereas the plate 1 was not cracked.

○: A crack in the plate 1 was smaller than 20% of the height of the plate 1.

x: A crack in the plate 1 was equal to or larger than 20% of the height of the plate 1 without a crack in the top panel.

XX: A crack in the plate 1 reached the top panel.

(7) Vicat Softening Temperature (7-1) Vicat Softening Temperature (° C.) of Lens Molded Article The Vicat softening temperature of the lens molded article ribbed plate 1 was measured according to JIS K6717-1 and -2.

The measurement conditions involved Method B50, a load of 50 N, and a temperature increase rate of 50° C./h.

The measurement results are shown in Table 5 below.

(7-2) Vicat Softening Temperature (° C.) of Housing Molded Article

The Vicat softening temperature of the housing molded article plate 2 was measured according to a method given below.

ASA resin and AES resin: according to JIS K6876-1 and -2

ABS resin: according to JIS K6934-1 and -2

The measurement conditions involved Method B50, a load of 50 N, and a temperature increase rate of 50° C./h.

The measurement results are shown in Table 4 below.

(8) Heating Test

The molded articles laser-welded in the paragraph (4) were left at 23° C. and 50% humidity for 24 hours or longer.

Then, the test specimen was heated in an oven of 95° C. for 2 hours.

The test specimen was taken out of the oven and brought back to ordinary temperature. Then, the deformation status of the appearance was confirmed.

If deformation occurred, whether the ribbed plate 1 (lens molded article) or the plate 2 (housing molded article) was deformed was confirmed.

Confirmation Item:

Warpage in the top panel of the ribbed plate 1 and the plate 2

Contraction in the Gate Portion

Surface strain in the top panel of the ribbed plate 1 and the plate 2. This was evaluated on the basis of strain in an image observed by the reflection of a fluorescent lamp.

The evaluation results are shown in Table 5 below.

○: No change was confirmed in the items described above.

x: Change was confirmed in the items described above.

(9) Coefficient of Linear Expansion

The lens molded article ribbed plate 1 and the housing molded article plate 2 were each cut into a dimension given below, and their coefficients of linear expansion were measured according to JIS K7197.

Test specimen dimension: 5±1 mm×10±1 mm

Temperature increase rate: 5° C./rain

Atmosphere: nitrogen

Measurement temperature: 0 to 10° C.

The measurement results are shown in Tables 4 and 5.

(10) Test on Rate of Decrease in Amount Caused by Heating

The rate of decrease in the amount of the housing molded article after the heating test was measured.

Measurement apparatus: differential thermal balance TG8120 (manufactured by Rigaku Corp.)

Test specimen: pellets

Atmosphere: air

Measurement temperature: 260° C.

Heating time: 30 min

The results of measuring the rate of decrease in mass after heating at 260° C. for 30 minutes are shown in Table 4.

<III. Production of Methacrylic Resin Composition>

[Production of Methacrylic Resin Composition (Resin 1)]

A container having a stirrer was charged with 2 kg of deionized water, 59 g of calcium phosphate, 35 g of calcium carbonate, and 0.35 g of sodium lauryl sulfate to obtain a mixed solution (a).

Subsequently, a 60-L reactor was charged with 27 kg of deionized water, heated to 80° C., and charged with the mixed solution (a) and the raw materials for the polymer (1) in amounts shown in Table 1 below.

Then, suspension polymerization was performed with the temperature kept at approximately 80° C. An exothermic peak was observed 70 minutes after the addition of the raw materials for the polymer (1).

Then, the temperature was raised to 92° C. at a rate of 1° C./min and then kept at 92° C. to 94° C. for 30 minutes.

Then, the temperature was dropped to 80° C. at a rate of 1° C./min. Then, this polymer (1) was sampled, and its polymerization-average molecular weight was measured by GPC.

Next, the reactor was charged with the raw materials for the polymer (2) in the amounts shown in Table 1 below. Subsequently, suspension polymerization was performed with the temperature kept at approximately 80° C.

An exothermic peak was observed 100 minutes after the addition of the raw materials for the polymer (2).

Then, the temperature was raised to 92° C. at a rate of 1° C./min, and the polymer was then aged for 60 minutes to substantially terminate the polymerization reaction.

Next, the reactor was cooled to 50° C. and charged with 20% by mass of sulfuric acid for the dissolution of the suspending agent.

Subsequently, the polymerization reaction solution was sifted through a 1.68-mm mesh sieve to remove aggregates. The obtained resin beads were subjected to washing, dehydration, and drying treatments to obtain a methacrylic resin composition.

The weight-average molecular weight of this methacrylic resin composition was measured by GPC. The GPC elution curve of the polymer (1) was multiplied by the abundance ratio of the polymer (1). The GPC portion of the polymer (1) was removed from the GPC elution curve of the resin beads to determine the weight-average molecular weight of the polymer (2).

[Production of Methacrylic Resin Compositions (Resins 2 to 6, 12 to 14, and 17 to 21)]

The raw materials shown in following Table 1 were used in polymerization in the same way as the method of (resin 1) mentioned above to obtain each methacrylic resin composition.

The monomer charging compositional ratio between the polymer (1) and the polymer (2) for the methacrylic resin compositions (resins 2 to 6, 12 to 14, and 17 to 21), and their weight-average molecular weights (Mw) are shown in Table 2.

[Production of Methacrylic Resin (Resin 7)]

A container having a stirrer was charged with 2 kg of deionized water, 59 g of calcium phosphate, 35 g of calcium carbonate, and 0.35 g of sodium lauryl sulfate to obtain a mixed solution (a).

Subsequently, a 60-L reactor was charged with 27 kg of deionized water, heated to 80° C., and charged with the mixed solution (a) and the raw materials for the polymer (1) in amounts shown in Table 1 below.

Then, suspension polymerization was performed with the temperature kept at approximately 80° C. An exothermic peak was observed 70 minutes after the addition of the raw materials for the polymer (1).

Then, the temperature was raised to 92° C. at a rate of 1° C./min and then kept at 92° C. to 94° C. for 30 minutes.

Then, the temperature was dropped to 80° C. at a rate of 1° C./min, and the polymer was then aged for 60 minutes to substantially terminate the polymerization reaction.

Next, the reactor was cooled to 50° C. and charged with 20% by mass of sulfuric acid for the dissolution of the suspending agent.

Subsequently, the polymerization reaction solution was sifted through a 1.68-mm mesh sieve to remove aggregates. The obtained resin beads were subjected to washing, dehydration, and drying treatments to obtain a methacrylic resin composition.

This methacrylic resin was sampled, and its polymerization-average molecular weight was measured by GPC.

(Resin 7) was constituted by the polymer (1) alone and therefore described as a methacrylic resin.

[Production of Methacrylic Resin (Resin 8)]

The raw materials shown in Table 1 above were used in polymerization in the same way as the method of (resin 7) mentioned above to obtain a methacrylic resin composition.

(Resin 8) was constituted by the polymer (1) alone and therefore described as a methacrylic resin.

[Production of Methacrylic Resin (Resin 9)]

A container having a stirrer was charged with 2 kg of deionized water, 59 g of calcium phosphate, 35 g of calcium carbonate, and 0.35 g of sodium lauryl sulfate to obtain a mixed solution (a).

Subsequently, a 60-L reactor was charged with 27 kg of deionized water, heated to 80° C., and charged with the mixed solution (a) and the raw materials for the polymer (2) in amounts shown in Table 1 below.

Then, suspension polymerization was performed with the temperature kept at approximately 80° C. An exothermic peak was observed 70 minutes after the addition of the raw materials for the polymer (2).

Then, the temperature was raised to 92° C. at a rate of 1° C./min and then kept at 92° C. to 94° C. for 30 minutes.

Then, the temperature was dropped to 80° C. at a rate of 1° C./min, and the polymer was then aged for 60 minutes to substantially terminate the polymerization reaction.

Next, the reactor was cooled to 50° C. and charged with 20% by mass of sulfuric acid for the dissolution of the suspending agent.

Subsequently, the polymerization reaction solution was sifted through a 1.68-mm mesh sieve to remove aggregates. The obtained resin beads were subjected to washing, dehydration, and drying treatments to obtain a methacrylic resin.

This methacrylic resin was sampled, and its polymerization-average molecular weight was measured by GPC.

(Resin 9) was constituted by the polymer (2) alone and therefore described as a methacrylic resin.

[Production of Methacrylic Resins (Resins 10, 11, 15, 16, 22, and 23)]

The raw materials shown in Table 1 above were used in polymerization in the same way as the method of (resin 9) mentioned above to obtain each methacrylic resin.

(Resins 10, 11, 15, 16, 22, and 23) were each constituted by the polymer (2) alone and therefore described as a methacrylic resin.

The amounts of the raw materials added for the polymers (1) and (2) in the resins 1 to 23 mentioned above are shown in Table 1 below, and the weight-average molecular weights (Mw) of the polymers (1) and (2) in the resins 1 to 23 are shown in Table 2 below.

The step of granulating the methacrylic resin composition used in each of Examples 1 to 25 and Comparative Examples 1 to 12 will be described below.

[Method for Granulating Methacrylic Resin Composition Used in Example 1]

The methacrylic resin composition obtained by the method for producing resin 1 was melt-kneaded in a ϕ30 mm twin-screw extruder set to 230° C., and the strands were cooled and cut to obtain resin pellets (resin 1).

(Resin 1) constituting the obtained resin pellets had a weight-average molecular weight of 95000 and a peak molecular weight (Mp) of 72000.

As a result of compositional analysis by pyrolysis gas chromatography (GC), the composition of the methacrylic resin composition of (resin 1) was 97.8% by mass of MMA and 2.2% by mass of MA.

The composition and weight-average molecular weight of the obtained resin pellets are shown in Table 3.

[Methods for Granulating Methacrylic Resin Compositions Used in Examples 2 to 4, 8 to 10, 13 to 16, 18, 20, 21, and 23 and Comparative Examples 1 to 6, 9, 10, and 12]

In Examples 2 to 4, 8 to 10, 13 to 16, 18, 20, 21, and 23, resin pellets were obtained in the same way as the granulation method of Example 1.

In Comparative Examples 1 to 6, 9, 10, and 12, the resins described in Table 2 were used and melt-kneaded in a ϕ30 mm twin-screw extruder set to 230° C., and the strands were cooled and cut to obtain resin pellets.

The composition and weight-average molecular weights of the obtained resin pellets are shown in Table 3 below.

[Method for Granulating Methacrylic Resin Composition Used in Example 5]

In Example 5, respective resins obtained in the methods for producing resin 7 and resin 9 described above were added to a tumbler according to the ratio described in Table 2 below, blended, and then melt-kneaded in a ϕ30 mm twin-screw extruder set to 230° C., and the strands were cooled and cut to obtain resin pellets.

The composition and weight-average molecular weight of the obtained resin pellets are shown in Table 3 below.

[Methods for Granulating Methacrylic Resin Compositions Used in Examples 6, 7, 11, 12, 17, 19, 22, 24, and 25 and Comparative Examples 7, 8, and 11]

In the same way as the method of Example 5 mentioned above, respective resins shown in Table 2 were added to a tumbler according to the ratio described in Table 2 below, blended, and then melt-kneaded in a ϕ30 mm twin-screw extruder set to 230° C., and the strands were cooled and cut to obtain resin pellets.

The composition and weight-average molecular weights of the obtained resin pellets are shown in Table 3 below.

[Method for Forming Lens Molded Article of Example 1]

The resin pellets obtained in [Method for granulating methacrylic resin composition used in Example 1] described above were used and molded into ribbed plate 1 under the conditions described in the paragraph (2-1) Method for forming lens molded article to obtain a lens molded article.

[Methods for Forming Lens Molded Articles of Examples 2 to 24 and Comparative Examples 1 to 12]

The resin pellets obtained in [Methods for granulating methacrylic resin compositions or methacrylic resins used in Examples 2 to 25 and Comparative Examples 1 to 12] described above were used and molded into ribbed plates 1 under the conditions described in the paragraph (2-1) Method for forming lens molded article to obtain lens molded articles.

[Method for Forming Housing Molded Article for Example 1]

The resin A was used and molded into plate 2 under the conditions described in the paragraph (2-2) Method for forming housing molded article to obtain a housing molded article.

[Methods for Forming Housing Molded Articles for Examples 2 to 25 and Comparative Examples 1 to 12]

The resins for housing molded article described in Table 5 were used and molded into plates 2 under the conditions described in the paragraph (2-2) Method for forming housing molded article to obtain housing molded articles.

[Laser Welding Method]

The lens molded article and the housing molded article combined as described in Table 5 were welded according to the laser welding method in the paragraph (4) to obtain post-welding molded articles, i.e., vehicle lamps of Examples 1 to 25 and Comparative Examples 1 to 12.

TABLE 1

| | Polymer (1) | | | | | Polymer (2) | | | | | | | Suspending agent washing |
|---|---|---|---|---|---|---|---|---|---|---|---|---|---|
| | MMA (g) | MA (g) | EA (g) | Lauroyl peroxide (g) | n-Octyl-mercaptan (g) | MMA (g) | MA (g) | EA (g) | ST (g) | PMI (g) | Lauroyl peroxide (g) | n-Octyl-mercaptan (g) | 20 wt % sulfuric acid (g) |
| Resin 1 | 4277 | 123 | 0 | 26.4 | 69.7 | 16474 | 1126 | 0 | 0 | 0 | 35.2 | 34.1 | 300 |
| Resin 2 | 5500 | 0 | 0 | 33.0 | 87.1 | 16236 | 264 | 0 | 0 | 0 | 33.0 | 25.6 | 300 |
| Resin 3 | 5500 | 0 | 0 | 33.0 | 74.7 | 16005 | 495 | 0 | 0 | 0 | 33.0 | 29.0 | 300 |
| Resin 4 | 5445 | 55.0 | 0 | 33.0 | 57.9 | 15708 | 792 | 0 | 0 | 0 | 33.0 | 14.8 | 300 |
| Resin 5 | 4356 | 44.0 | 0 | 26.4 | 15.1 | 16896 | 704 | 0 | 0 | 0 | 35.2 | 44.4 | 300 |
| Resin 6 | 3960 | 0 | 0 | 23.8 | 41.7 | 17409 | 631 | 0 | 0 | 0 | 36.1 | 11.9 | 300 |
| Resin 7 | 21846 | 154 | 0 | 44.0 | 232 | — | — | — | — | — | — | — | 300 |
| Resin 8 | 22000 | 0 | 0 | 44.0 | 348 | — | — | — | — | — | — | — | 300 |
| Resin 9 | — | — | — | — | — | 21230 | 770 | 0 | 0 | 0 | 44.0 | 39.8 | 300 |
| Resin 10 | — | — | — | — | — | 20900 | 1100 | 0 | 0 | 0 | 44.0 | 20.6 | 300 |
| Resin 11 | — | — | — | — | — | 21340 | 660 | 0 | 0 | 0 | 44.0 | 28.2 | 300 |
| Resin 12 | 3524 | 436 | 0 | 23.8 | 41.7 | 16687 | 1353 | 0 | 0 | 0 | 36.1 | 34.1 | 300 |
| Resin 13 | 7677 | 23.1 | 0 | 46.2 | 155 | 14229 | 71.5 | 0 | 0 | 0 | 28.6 | 13.4 | 300 |
| Resin 14 | 5500 | 0 | 0 | 33.0 | 74.7 | 14504 | 1997 | 0 | 0 | 0 | 33.0 | 18.8 | 300 |
| Resin 15 | — | — | — | — | — | 21120 | 880 | 0 | 0 | 0 | 44.0 | 70.5 | 300 |
| Resin 16 | — | — | — | — | — | 19294 | 2706 | 0 | 0 | 0 | 44.0 | 43.3 | 300 |
| Resin 17 | 2803 | 57.2 | 0 | 17.2 | 30.1 | 18374 | 766 | 0 | 0 | 0 | 38.3 | 18.7 | 300 |
| Resin 18 | 5500 | 0 | 0 | 33.0 | 57.9 | 16005 | 0 | 495 | 0 | 0 | 32.0 | 29.4 | 300 |
| Resin 19 | 5500 | 0 | 0 | 33.0 | 57.9 | 16005 | 0 | 0 | 495 | 0 | 32.0 | 29.4 | 300 |
| Resin 20 | 5500 | 0 | 55 | 33.0 | 58.5 | 16005 | 495 | 0 | 0 | 0 | 33.0 | 29.4 | 300 |
| Resin 21 | 8800 | 0 | 0 | 52.8 | 139 | 13134 | 66.0 | 0 | 0 | 0 | 26.4 | 9.6 | 300 |
| Resin 22 | — | — | — | — | — | 16940 | 0 | 0 | 1760 | 3300 | 33.9 | 39.2 | 300 |
| Resin 23 | — | — | — | — | — | 19470 | 0 | 0 | 880 | 1650 | 38.9 | 39.2 | 300 |

[Common formulation]

Mixed solution (a): deionized water: 2000 (g), calcium phosphate: 59 (g), calcium carbonate: 35 (g), sodium lauryl sulfuric acid: 0.35 (g)

Reactor: deionized water: 27000 (g)

TABLE 2

| | Polymer (1) | | | | | Polymer (2) | | | | | | | | |
|---|---|---|---|---|---|---|---|---|---|---|---|---|---|---|
| | | Monomer charging composition (mass %) | | | | | Monomer charging composition (mass %) | | | | | | Ratio of polymer (1) | Ratio of polymer (2) |
| | | MMA | MA | EA | Mw ($10^4$) | | MMA | MA | EA | ST | PMI | Mw ($10^4$) | (mass %) | (mass %) |
| Example 1 | Resin 1 | 97.2 | 2.8 | 0 | 2.1 | Resin 1 | 93.6 | 6.4 | 0 | 0 | 0 | 13.2 | 20 | 80 |
| Example 2 | Resin 2 | 100 | 0 | 0 | 2.1 | Resin 2 | 98.4 | 1.6 | 0 | 0 | 0 | 16.1 | 25 | 75 |
| Example 3 | Resin 3 | 100 | 0 | 0 | 2.4 | Resin 3 | 97.0 | 3.0 | 0 | 0 | 0 | 14.4 | 25 | 75 |
| Example 4 | Resin 4 | 99.0 | 1.0 | 0 | 3.0 | Resin 4 | 95.2 | 4.8 | 0 | 0 | 0 | 26.0 | 25 | 75 |
| Example 5 | Resin 7 | 99.3 | 0.7 | 0 | 3.0 | Resin 11 | 97.0 | 3.0 | 0 | 0 | 0 | 19.0 | 30 | 70 |
| Example 6 | Resin 7 | 99.3 | 0.7 | 0 | 3.0 | Resin 10 | 95.0 | 5.0 | 0 | 0 | 0 | 25.0 | 25 | 75 |
| Example 7 | Resin 8 | 100 | 0 | 0 | 2.1 | Resin 9 | 96.5 | 3.5 | 0 | 0 | 0 | 13.9 | 25 | 75 |
| Example 8 | Resin 12 | 89.0 | 11.0 | 0 | 3.0 | Resin 12 | 92.5 | 7.5 | 0 | 0 | 0 | 11.0 | 18 | 82 |
| Example 9 | Resin 13 | 99.7 | 0.3 | 0 | 1.7 | Resin 13 | 99.5 | 0.5 | 0 | 0 | 0 | 25.0 | 35 | 65 |
| Example 10 | Resin 14 | 100 | 0 | 0 | 2.4 | Resin 14 | 87.9 | 12.1 | 0 | 0 | 0 | 21.0 | 25 | 75 |
| Example 11 | Resin 7 | 99.3 | 0.7 | 0 | 3.0 | Resin 11 | 97.0 | 3.0 | 0 | 0 | 0 | 19.0 | 25 | 75 |
| Example 12 | Resin 7 | 99.3 | 0.7 | 0 | 3.0 | Resin 9 | 96.5 | 3.5 | 0 | 0 | 0 | 13.9 | 9 | 91 |
| Example 13 | Resin 16 | 98.0 | 2.0 | 0 | 3.0 | Resin 16 | 96.0 | 4.0 | 0 | 0 | 0 | 24.0 | 13 | 87 |
| Example 14 | Resin 17 | 100 | 0 | 0 | 3.0 | Resin 17 | 97.0 | 0 | 3.0 | 0 | 0 | 14.2 | 25 | 75 |
| Example 15 | Resin 18 | 100 | 0 | 0 | 3.0 | Resin 18 | 97.0 | 0 | 0 | 3.0 | 0 | 14.2 | 25 | 75 |
| Example 16 | Resin 19 | 99.0 | 0 | 1.0 | 3.0 | Resin 19 | 97.0 | 3.0 | 0 | 0 | 0 | 14.2 | 25 | 75 |
| Example 17 | Resin 8 | 99.9 | 0.1 | 0 | 2.1 | Resin 11 | 99.7 | 0.3 | 0 | 0 | 0 | 19.0 | 30 | 70 |
| Example 18 | Resin 3 | 100 | 0 | 0 | 2.4 | Resin 3 | 97.0 | 3.0 | 0 | 0 | 0 | 14.4 | 25 | 75 |
| Example 19 | Resin 7 | 99.3 | 0.7 | 0 | 3.0 | Resin 10 | 95.0 | 5.0 | 0 | 0 | 0 | 25.0 | 25 | 75 |
| Example 20 | Resin 13 | 99.7 | 0.3 | 0 | 1.7 | Resin 13 | 99.5 | 0.5 | 0 | 0 | 0 | 25.0 | 35 | 65 |
| Example 21 | Resin 3 | 100 | 0 | 0 | 2.4 | Resin 3 | 97.0 | 3.0 | 0 | 0 | 0 | 14.4 | 25 | 75 |
| Example 22 | Resin 7 | 99.3 | 0.7 | 0 | 3.0 | Resin 10 | 95.0 | 5.0 | 0 | 0 | 0 | 25.0 | 25 | 75 |
| Example 23 | Resin 13 | 99.7 | 0.3 | 0 | 1.7 | Resin 13 | 99.5 | 0.5 | 0 | 0 | 0 | 25.0 | 35 | 65 |
| Example 24 | Resin 8 | 100 | 0 | 0 | 2.1 | Resin 22 | 77.0 | 0 | 0 | 8.0 | 15.0 | 14.2 | 25 | 75 |
| Example 25 | Resin 8 | 100 | 0 | 0 | 2.1 | Resin 23 | 88.5 | 0 | 0 | 4.0 | 7.5 | 14.3 | 25 | 75 |

TABLE 2-continued

| | Polymer (1) | | | | | Polymer (2) | | | | | | | | |
|---|---|---|---|---|---|---|---|---|---|---|---|---|---|---|
| | | Monomer charging composition (mass %) | | | | | Monomer charging composition (mass %) | | | | | | Ratio of polymer (1) | Ratio of polymer (2) |
| | | MMA | MA | EA | Mw ($10^4$) | | MMA | MA | EA | ST | PMI | Mw ($10^4$) | (mass %) | (mass %) |
| Comparative Example 1 | — | — | — | — | — | Resin 9 | 96.5 | 3.5 | 0 | 0 | 0 | 13.9 | 0 | 100 |
| Comparative Example 2 | — | — | — | — | — | Resin 11 | 97.0 | 3.0 | 0 | 0 | 0 | 19.0 | 0 | 100 |
| Comparative Example 3 | — | — | — | — | — | Resin 15 | 96.0 | 4.0 | 0 | 0 | 0 | 8.5 | 0 | 100 |
| Comparative Example 4 | — | — | — | — | — | Resin 16 | 87.7 | 12.3 | 0 | 0 | 0 | 13.0 | 0 | 100 |
| Comparative Example 5 | Resin 5 | 99.0 | 1.0 | 0 | 5.0 | Resin 5 | 96.0 | 4.0 | 0 | 0 | 0 | 10.0 | 20 | 80 |
| Comparative Example 6 | Resin 6 | 100 | 0 | 0 | 3.0 | Resin 6 | 96.5 | 3.5 | 0 | 0 | 0 | 34.0 | 18 | 82 |
| Comparative Example 7 | Resin 7 | 99.3 | 0.7 | 0 | 3.0 | Resin 9 | 96.5 | 3.5 | 0 | 0 | 0 | 13.9 | 3 | 97 |
| Comparative Example 8 | Resin 8 | 100 | 0 | 0 | 2.1 | Resin 9 | 96.5 | 3.5 | 0 | 0 | 0 | 13.9 | 40 | 60 |
| Comparative Example 9 | Resin 20 | 100 | 0 | 0 | 2.1 | Resin 20 | 99.5 | 0.5 | 0 | 0 | 0 | 31.0 | 40 | 60 |
| Comparative Example 10 | Resin 3 | 100 | 0 | 0 | 2.4 | Resin 3 | 97.0 | 3.0 | 0 | 0 | 0 | 14.4 | 25 | 75 |
| Comparative Example 11 | Resin 7 | 99.3 | 0.7 | 0 | 3.0 | Resin 10 | 95.0 | 5.0 | 0 | 0 | 0 | 25.0 | 25 | 75 |
| Comparative Example 12 | Resin 13 | 99.7 | 0.3 | 0 | 1.7 | Resin 13 | 99.5 | 0.5 | 0 | 0 | 0 | 25.0 | 35 | 65 |

TABLE 3

| | Composition (mass %) of methacrylic resin composition | | | | | |
|---|---|---|---|---|---|---|
| | MMA | MA | EA | ST | PMI | Mw ($10^4$) |
| Example 1 | 94.3 | 5.7 | 0 | 0 | 0 | 11.0 |
| Example 2 | 98.8 | 1.2 | 0 | 0 | 0 | 12.5 |
| Example 3 | 97.8 | 2.3 | 0 | 0 | 0 | 11.5 |
| Example 4 | 96.2 | 3.9 | 0 | 0 | 0 | 19.9 |
| Example 5 | 97.7 | 2.3 | 0 | 0 | 0 | 14.4 |
| Example 6 | 96.1 | 3.9 | 0 | 0 | 0 | 19.2 |
| Example 7 | 97.4 | 2.6 | 0 | 0 | 0 | 11.0 |
| Example 8 | 91.9 | 8.1 | 0 | 0 | 0 | 9.7 |
| Example 9 | 99.6 | 0.4 | 0 | 0 | 0 | 15.6 |
| Example 10 | 90.9 | 9.1 | 0 | 0 | 0 | 16.0 |
| Example 11 | 97.6 | 2.4 | 0 | 0 | 0 | 15.1 |
| Example 12 | 96.8 | 3.2 | 0 | 0 | 0 | 12.9 |
| Example 13 | 96.3 | 3.7 | 0 | 0 | 0 | 21.1 |
| Example 14 | 97.8 | 0 | 2.3 | 0 | 0 | 11.6 |
| Example 15 | 97.8 | 0 | 0 | 2.3 | 0 | 11.6 |
| Example 16 | 97.5 | 2.3 | 0.3 | 0 | 0 | 11.6 |
| Example 17 | 99.8 | 0.2 | 0 | 0 | 0 | 13.6 |
| Example 18 | 97.8 | 2.3 | 0 | 0 | 0 | 11.5 |
| Example 19 | 96.1 | 3.9 | 0 | 0 | 0 | 19.2 |
| Example 20 | 99.6 | 0.4 | 0 | 0 | 0 | 15.6 |
| Example 21 | 97.8 | 2.3 | 0 | 0 | 0 | 11.5 |
| Example 22 | 96.1 | 3.9 | 0 | 0 | 0 | 19.2 |
| Example 23 | 99.6 | 0.4 | 0 | 0 | 0 | 15.6 |
| Example 24 | 82.8 | 0 | 0 | 6.0 | 11.3 | 11.3 |
| Example 25 | 91.4 | 0 | 0 | 3.0 | 5.6 | 11.5 |

TABLE 3-continued

| | Composition (mass %) of methacrylic resin composition | | | | | |
|---|---|---|---|---|---|---|
| | MMA | MA | EA | ST | PMI | Mw ($10^4$) |
| Comparative Example 1 | 96.5 | 3.5 | 0 | 0 | 0 | 13.9 |
| Comparative Example 2 | 97.0 | 3.0 | 0 | 0 | 0 | 19.0 |
| Comparative Example 3 | 96.0 | 4.0 | 0 | 0 | 0 | 8.6 |
| Comparative Example 4 | 87.7 | 12.3 | 0 | 0 | 0 | 13.0 |
| Comparative Example 5 | 96.6 | 3.4 | 0 | 0 | 0 | 8.6 |
| Comparative Example 6 | 97.1 | 2.9 | 0 | 0 | 0 | 27.4 |
| Comparative Example 7 | 96.6 | 3.4 | 0 | 0 | 0 | 13.4 |
| Comparative Example 8 | 97.9 | 2.1 | 0 | 0 | 0 | 8.7 |
| Comparative Example 9 | 99.7 | 0.3 | 0 | 0 | 0 | 18.1 |
| Comparative Example 10 | 97.8 | 2.3 | 0 | 0 | 0 | 11.5 |
| Comparative Example 11 | 96.1 | 3.9 | 0 | 0 | 0 | 19.2 |
| Comparative Example 12 | 99.6 | 0.4 | 0 | 0 | 0 | 15.6 |

TABLE 4

| | | | Housing molded article | | | | | |
|---|---|---|---|---|---|---|---|---|
| | Grade | | MFR-3 220° C. load of 10 kg (g/10 min) | Vicat softening temperature (° C.) | Charging pressure (Mpa) | Amount of warpage (mm) | Coefficient of linear expansion (/° C.) | Decrease (%) in amount after heating test at 260° C. for 30 min |
| Resin A | AW553HS | ASA Resin | 9 | 104 | 83 | 0.2 | 7.1 | 0.4 |
| Resin B | SK30 | AES Resin | 18 | 102 | 80 | 0.1 | 7.3 | 0.6 |

TABLE 4-continued

| Grade | | | Housing molded article: MFR-3 220° C. load of 10 kg (g/10 min) | Vicat softening temperature (° C.) | Charging pressure (Mpa) | Amount of warpage (mm) | Coefficient of linear expansion (/° C.) | Decrease (%) in amount after heating test at 260° C. for 30 min |
|---|---|---|---|---|---|---|---|---|
| Resin C | ABS190 | ABS Resin | 25 | 102 | 79 | 0.1 | 7.5 | 0.5 |
| Resin D | S411A | ASA Resin | 60 | 94 | 73 | 0 | 9.1 | 1.7 |

TABLE 5

| | Lens molded article | | | | | | | |
|---|---|---|---|---|---|---|---|---|
| | MFR-1 230° C. load of 3.8 kg (g/10 min) | MFR-2 230° C. load of 10 kg (g/10 min) | MFR RATIO (MFR-2/ MFR-1) | Vicat softening temperature (° C.) | Molded article temperature (° C.) | Charging pressure (Mpa) | Amount of warpage (mm) | Coefficient of linear expansion (/° C.) |
| Example 1 | 4.1 | 21.9 | 5.3 | 103 | 230 | 85 | 0.2 | 6.2 |
| Example 2 | 0.8 | 4.7 | 5.6 | 108 | 260 | 86 | 0.2 | 6.4 |
| Example 3 | 1.8 | 10.2 | 5.6 | 107 | 250 | 85 | 0.1 | 6.2 |
| Example 4 | 0.3 | 1.7 | 5.7 | 105 | 260 | 87 | 0.2 | 6.3 |
| Example 5 | 0.8 | 4.5 | 6.0 | 107 | 260 | 84 | 0.1 | 6.2 |
| Example 6 | 0.3 | 2.0 | 5.7 | 105 | 260 | 89 | 0.2 | 6.2 |
| Example 7 | 2.4 | 13.5 | 5.6 | 106 | 240 | 86 | 0.1 | 6.2 |
| Example 8 | 9.2 | 47.2 | 5.1 | 101 | 220 | 88 | 0.3 | 6.4 |
| Example 9 | 0.3 | 1.9 | 6.3 | 109 | 260 | 85 | 0.2 | 6.2 |
| Example 10 | 1.3 | 7.3 | 5.6 | 101 | 250 | 87 | 0.2 | 6.2 |
| Example 11 | 0.6 | 3.6 | 5.6 | 107 | 260 | 85 | 0.2 | 6.2 |
| Example 12 | 1.5 | 7.0 | 4.7 | 106 | 250 | 89 | 0.4 | 6.2 |
| Example 13 | 0.3 | 1.5 | 4.9 | 106 | 260 | 88 | 0.3 | 6.3 |
| Example 14 | 1.8 | 9.8 | 5.6 | 107 | 250 | 86 | 0.3 | 6.2 |
| Example 15 | 1.8 | 9.8 | 5.6 | 107 | 250 | 88 | 0.3 | 6.2 |
| Example 16 | 1.9 | 10.6 | 5.6 | 107 | 250 | 85 | 0.2 | 6.2 |
| Example 17 | 0.3 | 1.8 | 5.9 | 109 | 260 | 85 | 0.2 | 6.2 |
| Example 18 | 1.8 | 10.2 | 5.6 | 107 | 250 | 85 | 0.1 | 6.3 |
| Example 19 | 0.3 | 2.0 | 5.7 | 105 | 260 | 89 | 0.3 | 6.2 |
| Example 20 | 0.3 | 1.9 | 6.3 | 109 | 260 | 85 | 0.3 | 6.4 |
| Example 21 | 1.8 | 10.2 | 5.6 | 107 | 250 | 85 | 0.1 | 6.2 |
| Example 22 | 0.3 | 2.0 | 5.7 | 105 | 260 | 89 | 0.3 | 6.2 |
| Example 23 | 0.3 | 1.9 | 6.3 | 109 | 260 | 85 | 0.3 | 6.2 |
| Example 24 | 3.8 | 21.3 | 5.6 | 121 | 240 | 88 | 0.4 | 6.4 |
| Example 25 | 2.9 | 15.1 | 5.2 | 114 | 240 | 90 | 0.3 | 6.2 |
| Comparative Example 1 | 1.2 | 4.8 | 4.1 | 106 | 250 | 105 | 1 | 6.2 |
| Comparative Example 2 | 0.4 | 1.7 | 4.2 | 106 | 260 | 109 | 1.4 | 6.4 |
| Comparative Example 3 | 10.2 | 40.8 | 4.0 | 105 | 220 | 82 | 0.2 | 6.1 |
| Comparative Example 4 | 3.7 | 14.6 | 4.0 | 96 | 240 | 82 | 0.2 | 6.6 |
| Comparative Example 5 | 7.8 | 40.6 | 5.2 | 105 | 230 | 98 | 0.4 | 6.2 |
| Comparative Example 6 | 0.1 | 0.4 | 5.3 | 107 | 260 | 104 | 1.6 | 6.4 |
| Comparative Example 7 | 1.3 | 5.7 | 4.3 | 106 | 250 | 100 | 1.1 | 6.2 |
| Comparative Example 8 | 5.3 | 34.2 | 6.5 | 107 | 230 | 85 | 0.2 | 6.1 |
| Comparative Example 9 | 0.1 | 0.5 | 6.7 | 109 | 260 | 104 | 1.6 | 6.5 |
| Comparative Example 10 | 1.8 | 10.2 | 5.6 | 107 | 250 | 85 | 0.1 | 6.2 |
| Comparative Example 11 | 0.3 | 2.0 | 5.7 | 105 | 260 | 89 | 0.3 | 6.3 |
| Comparative Example 12 | 0.3 | 1.9 | 6.3 | 109 | 260 | 85 | 0.3 | 6.3 |

TABLE 5-continued

| | | Welded molded article | | | | | |
|---|---|---|---|---|---|---|---|
| | | Welding time | Destruction test | | | | |
| | | to reach 0.5 mm of sinking | Welding time (same as | Welding time 5 | Solvent | Heating test | |
| | Housing | (sec) | left) | sec | crack | Lens | Housing |
| Example 1 | Resin A | 4 | ○ | — | ○ | ○ | ○ |
| Example 2 | Resin A | 6 | ○ | X | ◎ | ○ | ○ |
| Example 3 | Resin A | 5 | ○ | ○ | ◎ | ○ | ○ |
| Example 4 | Resin A | 5 | ○ | ○ | ◎ | ○ | ○ |
| Example 5 | Resin A | 5 | ○ | ○ | ◎ | ○ | ○ |
| Example 6 | Resin A | 5 | ○ | ○ | ◎ | ○ | ○ |
| Example 7 | Resin A | 5 | ○ | ○ | ◎ | ○ | ○ |
| Example 8 | Resin A | 4 | ○ | — | ○ | ○ | ○ |
| Example 9 | Resin A | 6 | ○ | X | ○ | ○ | ○ |
| Example 10 | Resin A | 4 | ○ | — | ◎ | ○ | ○ |
| Example 11 | Resin A | 5 | ○ | ○ | ◎ | ○ | ○ |
| Example 12 | Resin A | 5 | ○ | ○ | ○ | ○ | ○ |
| Example 13 | Resin A | 5 | ○ | ○ | ◎ | ○ | ○ |
| Example 14 | Resin A | 5 | ○ | ○ | ◎ | ○ | ○ |
| Example 15 | Resin A | 5 | ○ | ○ | ○ | ○ | ○ |
| Example 16 | Resin A | 5 | ○ | ○ | ◎ | ○ | ○ |
| Example 17 | Resin A | 6 | ○ | X | ○ | ○ | ○ |
| Example 18 | Resin B | 5 | ○ | ○ | ◎ | ○ | ○ |
| Example 19 | Resin B | 5 | ○ | ○ | ◎ | ○ | ○ |
| Example 20 | Resin B | 6 | ○ | X | ○ | ○ | ○ |
| Example 21 | Resin C | 5 | ○ | ○ | ◎ | ○ | ○ |
| Example 22 | Resin C | 5 | ○ | ○ | ◎ | ○ | ○ |
| Example 23 | Resin C | 6 | ○ | X | ○ | ○ | ○ |
| Example 24 | Resin A | 9 | ○ | X | ○ | ○ | ○ |
| Example 25 | Resin A | 6 | ○ | X | ○ | ○ | ○ |
| Comparative Example 1 | Resin A | 5 | X | X | X | ○ | ○ |
| Comparative Example 2 | Resin A | 5 | X | X | ○ | ○ | ○ |
| Comparative Example 3 | Resin A | 5 | ○ | ○ | X X | ○ | ○ |
| Comparative Example 4 | Resin A | 3 | ○ | — | ○ | X | ○ |
| Comparative Example 5 | Resin A | 5 | ○ | ○ | X X | ○ | ○ |
| Comparative Example 6 | Resin A | 5 | X | X | ○ | ○ | ○ |
| Comparative Example 7 | Resin A | 5 | X | X | ○ | ○ | ○ |
| Comparative Example 8 | Resin A | 5 | ○ | ○ | X X | ○ | ○ |
| Comparative Example 9 | Resin A | 6 | X | X | ○ | ○ | ○ |
| Comparative Example 10 | Resin D | 4 | ○ | — | ◎ | ○ | X |
| Comparative Example 11 | Resin D | 4 | ○ | — | ◎ | ○ | X |
| Comparative Example 12 | Resin D | 5 | ○ | ○ | ○ | ○ | X |

In all of Examples 1 to 25, delamination did not occur at the welding interface in the destruction test of the laser welding products, demonstrating that the resins were firmly welded.

In addition, a crack after the solvent test fell within the range of ◎ to ○, demonstrating that the amount of a crack generated was small.

Furthermore, all of the test specimens of Examples 1 to 25 were confirmed to be not deformed in the heating test.

In Example 24, the lens molded article had high heat resistance, demonstrating that the welding time was long.

In Comparative Examples 1, 2, 6, 7, and 9, delamination occurred at the welding interface in the destruction test.

In Comparative Examples 3, 5, and 8, a solvent crack was graded as xx, demonstrating that the amount of a crack generated was large, though delamination did not occur at the welding interface in the destruction test.

In Comparative Example 4, the lens molded article was confirmed to be deformed in the heating test.

In Comparative Examples 10 to 12, only the housing molded article was confirmed to be deformed in the heating test.

The present application is based on Japanese Patent Application No. 2014-240539 filed to the Japan Patent Office on Nov. 27, 2014, the contents of which are incorporated herein by reference.

INDUSTRIAL APPLICABILITY

The vehicle lamp of the present invention has industrial applicability as a vehicle lamp applicable to various vehicles.

REFERENCE SIGNS LIST

1: ribbed plate (lens molded article)
2: plate (housing molded article)
3: welded portion
4: interfacial delamination
5: housing material destruction
6: lens material destruction
7: solvent crack
8: rib portion
9: post-welding test specimen
10: welding strength test specimen

The invention claimed is:

1. A vehicle lamp comprising a lens molded article and a housing molded article laser-welded to each other, the lens molded article comprising a methacrylic resin composition which comprises 70 to 99.9% by mass of a methacrylic acid ester monomer unit and 0.1 to 30% by mass of a unit of at least one additional vinyl monomer copolymerizable with the methacrylic acid ester monomer and satisfies following conditions (a) to (c), and the housing molded article comprising a resin which satisfies following condition (d):

(a) a weight-average molecular weight measured by gel permeation chromatography (GPC) is 90000 to 250000;

(b) a value of a mass (MFR-1) of the methacrylic resin composition emitted according to ISO1133 standard under conditions involving a temperature of 230° C. and a load of 3.8 kg for 10 minutes is in a range of 0.2 g/10 min or larger and smaller than 12 g/10 min;

(c) when a mass of the methacrylic resin composition emitted according to the ISO1133 standard under conditions involving a temperature of 230° C. and a load of 10 kg for 10 minutes is defined as MFR-2, an MFR ratio of following formula (1) is 4.5 or more:

MFR ratio=(MFR-2)/(MFR-1) (1); and (d) a mass (MFR-3) of the resin emitted according to the ISO1133 standard under conditions involving a temperature of 220° C. and a load of 10 kg for 10 minutes is 2 g/10 min or larger and 45 g/10 min or smaller.

2. The vehicle lamp according to claim 1, wherein the housing molded article comprises at least one resin selected from the group consisting of an ASA resin, an ABS resin, an AES resin, a SAS resin, and an ACS resin.

3. The vehicle lamp according to claim 1, wherein a difference in a Vicat softening temperature between the lens molded article and the housing molded article is 30° C. or less.

4. The vehicle lamp according to claim 1, wherein a Vicat softening temperature of the lens molded article is 98° C. or higher.

5. The vehicle lamp according to claim 1, wherein a Vicat softening temperature of the housing molded article is 96° C. or higher.

6. The vehicle lamp according to claim 1, wherein a value of the MFR-1 is in a range of 0.2 g/10 min or larger and smaller than 10 g/10 min.

7. The vehicle lamp according to claim 1, wherein the MFR ratio is 4.8 or more.

8. A lens molded article for laser welding comprising a methacrylic resin composition which comprises 70 to 99.9% by mass of a methacrylic acid ester monomer unit and 0.1 to 30% by mass of a unit of at least one additional vinyl monomer copolymerizable with the methacrylic acid ester monomer and satisfies following conditions (a) to (c):

(a) a weight-average molecular weight measured by gel permeation chromatography (GPC) is 90000 to 250000;

(b) a value of a mass (MFR-1) of the methacrylic resin composition emitted according to ISO1133 standard under conditions involving a temperature of 230° C. and a load of 3.8 kg for 10 minutes is in a range of 0.2 g/10 min or larger and smaller than 12 g/10 min; and (c) when a mass of the methacrylic resin composition emitted according to the ISO1133 standard under conditions involving a temperature of 230° C. and a load of 10 kg for 10 minutes is defined as MFR-2, an MFR ratio of following formula (1) is 4.5 or more:

MFR ratio=(MFR-2)/(MFR-1) (1).

* * * * *